US012377815B2

(12) United States Patent
Dieckmann et al.

(10) Patent No.: US 12,377,815 B2
(45) Date of Patent: Aug. 5, 2025

(54) CLEANING DEVICE FOR APPLYING A MEDIA PULSE TO A SURFACE ACCORDING TO THE VENTURI PRINCIPLE, COMPRESSED-AIR SYSTEM, CLEANING METHOD, CONTROL SYSTEM AND VEHICLE

(71) Applicant: ZF CV Systems Hannover GmbH, Hannover (DE)

(72) Inventors: Thomas Dieckmann, Pattensen (DE); Jan Fiebrandt, Hannover (DE); Gerd Schuenemann, Laatzen (DE); Jan Cohrs, Hannover (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 834 days.

(21) Appl. No.: 17/606,066

(22) PCT Filed: Apr. 28, 2020

(86) PCT No.: PCT/EP2020/061714
§ 371 (c)(1),
(2) Date: Oct. 25, 2021

(87) PCT Pub. No.: WO2020/225022
PCT Pub. Date: Nov. 12, 2020

(65) Prior Publication Data
US 2022/0194327 A1    Jun. 23, 2022

(30) Foreign Application Priority Data
May 3, 2019   (DE) ..................... 10 2019 111 469.1

(51) Int. Cl.
*B60S 1/54*   (2006.01)
*B05B 7/16*   (2006.01)
(Continued)

(52) U.S. Cl.
CPC ......... *B60S 1/54* (2013.01); *B05B 7/16* (2013.01); *B60S 1/481* (2013.01); *B60S 1/487* (2013.01); *B60S 1/52* (2013.01)

(58) Field of Classification Search
None
See application file for complete search history.

(56) References Cited

U.S. PATENT DOCUMENTS

2001/0054655 A1* 12/2001 Berg ..................... B60S 1/54
                                                          239/351
2005/0005954 A1   1/2005 Barani
(Continued)

FOREIGN PATENT DOCUMENTS

CN    1571708 A      1/2005
CN    201454425 U    5/2010
(Continued)

*Primary Examiner* — Omair Chaudhri
(74) *Attorney, Agent, or Firm* — LEYDIG, VOIT & MAYER, LTD.

(57) ABSTRACT

A cleaning device for dispensing a gaseous medium and/or a medium mixture includes a mixing element having a first feed connection in a main medium feed line, a second feed connection in a medium feed branch line, and a dispensing connection configured to dispense the gaseous medium and/or the medium mixture. The cleaning device further includes a pressure chamber on the main medium feed line and a switching valve arranged in the main medium feed line, downstream or and/or at the pressure chamber. The switching valve is configured to prevent passage of the gaseous medium through the mixing element in a first switching state and to allow passage of the gaseous medium in a second switching state. The cleaning device optionally additionally includes a regulating device arranged in the medium feed branch line and configured to regulate a feed of the liquid medium.

23 Claims, 8 Drawing Sheets

(51) Int. Cl.
  *B60S 1/48* (2006.01)
  *B60S 1/52* (2006.01)

(56) References Cited

U.S. PATENT DOCUMENTS

| | | | | |
|---|---|---|---|---|
| 2005/0011968 A1* | 1/2005 | Tracey | ................... | B08B 3/026 |
| | | | | 239/433 |
| 2013/0092758 A1* | 4/2013 | Tanaka | ...................... | B60S 1/52 |
| | | | | 239/284.1 |
| 2013/0255023 A1* | 10/2013 | Kikuta | ................... | B60S 1/583 |
| | | | | 15/250.02 |
| 2014/0166109 A1* | 6/2014 | Takai | ....................... | F04B 23/00 |
| | | | | 137/625.11 |
| 2014/0217194 A1* | 8/2014 | Han | ......................... | B60S 1/56 |
| | | | | 239/284.1 |
| 2018/0272998 A1* | 9/2018 | Schmidt | ............... | B05B 7/2424 |
| 2018/0272999 A1 | 9/2018 | Giraud et al. | | |
| 2018/0363945 A1* | 12/2018 | Dellock | .................. | B60S 1/488 |
| 2019/0031155 A1* | 1/2019 | Mizuno | ..................... | B08B 3/08 |
| 2019/0061698 A1* | 2/2019 | Mizuno | ................. | B60S 1/0848 |
| 2020/0346624 A1* | 11/2020 | Kahlund | ................. | B60S 1/548 |
| 2020/0391702 A1* | 12/2020 | Yamauchi | ................ | B60Q 9/00 |
| 2021/0001678 A1* | 1/2021 | Koyama | ................... | B60S 1/56 |
| 2022/0118950 A1* | 4/2022 | Ida | ........................... | B60S 1/56 |

FOREIGN PATENT DOCUMENTS

| | | | | |
|---|---|---|---|---|
| CN | 206168291 U | | 5/2017 | |
| CN | 206854187 U | * | 1/2018 | |
| DE | 3803491 A1 | * | 8/1989 | |
| DE | 19751500 A1 | * | 5/1999 | ............... B60S 1/50 |
| DE | 19835733 A1 | | 2/2000 | |
| JP | 2002037038 A | | 2/2002 | |
| JP | 2018003692 A | | 1/2018 | |
| WO | WO-2011079542 A1 | * | 7/2011 | ........... B60R 1/0602 |
| WO | WO-2020107247 A1 | * | 6/2020 | |

* cited by examiner

# CLEANING DEVICE FOR APPLYING A MEDIA PULSE TO A SURFACE ACCORDING TO THE VENTURI PRINCIPLE, COMPRESSED-AIR SYSTEM, CLEANING METHOD, CONTROL SYSTEM AND VEHICLE

CROSS REFERENCE TO RELATED APPLICATIONS

This application is a U.S. National Phase application under 35 U.S.C. § 371 of International Application No. PCT/EP2020/061714, filed on Apr. 28, 2020, and claims benefit to German Patent Application No. DE 10 2019 111 469.1, filed on May 3, 2019. The International Application was published in German on Nov. 12, 2020 as WO 2020/225022 A1 under PCT Article 21(2).

FIELD

The disclosure relates to a cleaning device for dispensing a gaseous medium, in particular compressed air, and/or a medium mixture that consists of the gaseous medium and a liquid medium, in particular water, preferably in the form of a medium sequence. The disclosure also relates to a compressed-air system, to a cleaning method, to a control system, and to a vehicle having such a cleaning device.

BACKGROUND

A cleaning device for cleaning sensors in vehicles typically includes a mixing element, a first feed connection in a main medium feed line for feeding the gaseous medium for passage through the mixing element, and a second feed connection in a medium feed branch line for feeding the liquid medium transversely to the passage into the mixing element, and a dispensing connection for dispensing the gaseous medium and/or the medium mixture, as well as a pressure chamber on the main medium feed line.

Such a cleaning device mentioned at the outset for parts of a motor vehicle is described in DE 198 35 733 A1. In this case, provision is made for the part of the motor vehicle to be supplied with a compressed air-liquid mixture, wherein a compressor provides compressed air for an intermediate pressure container having a valve. As soon as compressed air flows out of the latter in the direction of a nozzle head, a vacuum is produced in a further container holding the liquid and having a valve by the speed of flow of the compressed air. As a result of this vacuum, the liquid is then sucked in from this container in accordance with the venturi principle and mixed with the compressed air. The compressed air-liquid mixture formed in this way then emerges from the nozzle and impinges under pressure on the surface to be cleaned. In particular, it is envisaged in DE 198 35 733 A1 that by actuating the valve (not specified in any more detail) of the intermediate pressure container, the shut-off valve of the liquid container, which is designed as a check valve, is opened automatically as soon as compressed air flows to the nozzle.

The concept is still in need of improvement especially in respect of the control dependence of the cleaning device on a shut-off valve of the liquid container and the associated increased outlay in terms of equipment and therefore in terms of maintenance. Moreover, the concept is in need of improvement in respect of the liquid requirement of the cleaning device.

SUMMARY

In an embodiment, the present disclosure provides a cleaning device for dispensing a gaseous medium and/or a medium mixture that consists of the gaseous medium and a liquid medium. The cleaning device includes a mixing element having a first feed connection, in a main medium feed line, configured to feed the gaseous medium for passage through the mixing element, a second feed connection, in a medium feed branch line, configured to feed the liquid medium transversely to the passage into the mixing element, and a dispensing connection configured to dispense the gaseous medium and/or the medium mixture. The cleaning device further includes a pressure chamber on the main medium feed line and a switching valve arranged in the main medium feed line, downstream or and/or at the pressure chamber. The switching valve is configured to prevent passage of the gaseous medium through the mixing element in a first switching state and to allow passage of the gaseous medium in a second switching state. The switching valve is formed as a 3/2-way valve or as a double check valve. The cleaning device optionally additionally includes a regulating device arranged in the medium feed branch line and configured to regulate a feed of the liquid medium. In the second switching state of the switching valve in the main medium feed line, in which passage of the gaseous medium through the mixing element is allowed: the regulating device in the medium feed branch line prevents, in a first state, feeding of the liquid medium, wherein the gaseous medium is present at the dispensing connection in such a way that the dispensing connection can be supplied only with the gaseous medium, and the regulating device in the medium feed branch line allows, in a second state, feeding of the liquid medium, wherein the gaseous medium is present at the dispensing connection and the liquid medium can be drawn in at the second feed connection in order to supply the dispensing connection with the medium mixture.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
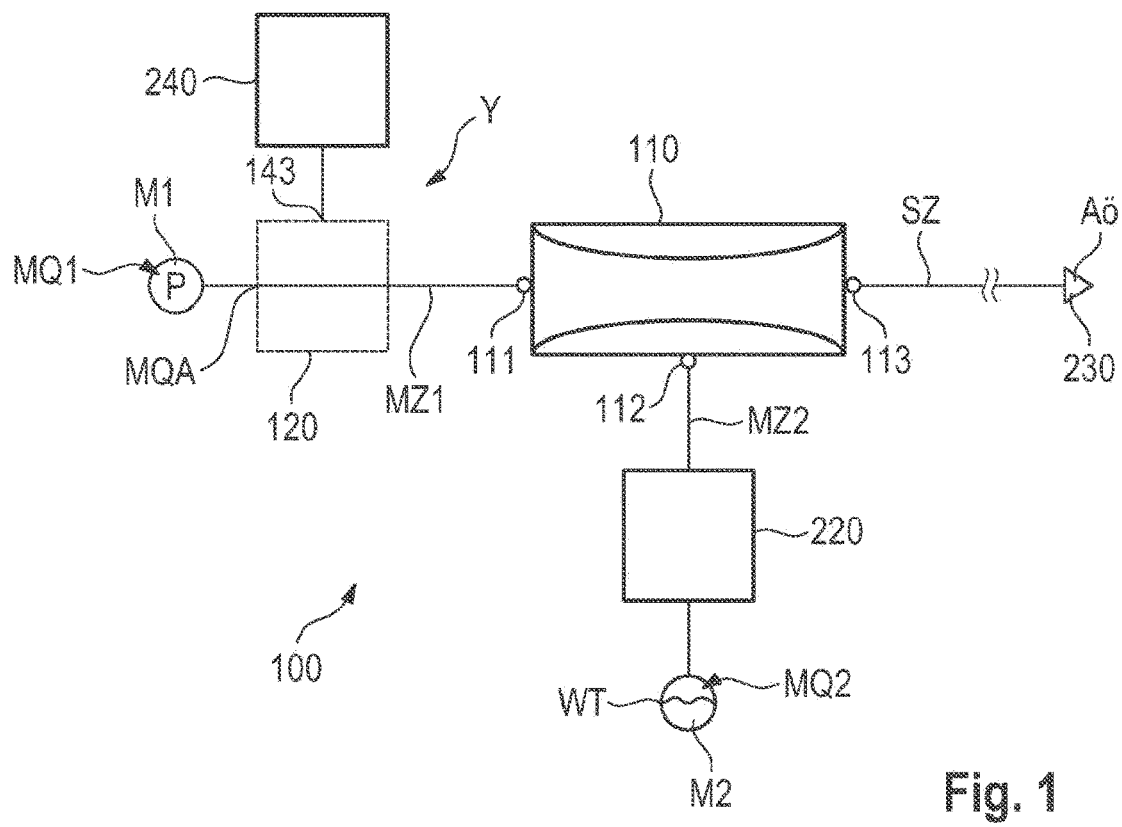
FIG. 1 shows a first preferred embodiment of a cleaning device, wherein a switching valve is arranged in the main medium feed line and/or a regulating device is arranged in the medium feed branch line, namely a metering and/or control device is arranged in the medium feed branch line.

It is desirable to ensure reliable and thorough cleaning, in particular with relatively low outlay, especially in terms of equipment. Furthermore, a low consumption of energy and cleaning media is desirable, as is robust, in particular as low-maintenance as possible, construction.

According to an aspect of the present disclosure, a cleaning device is provided that at least partially addresses or eliminates the abovementioned problems. In particular, the intention is to achieve a high degree of reliability and thoroughness in cleaning, and to reduce the outlay in terms of equipment and the outlay with regard to maintenance of a cleaning device. A relatively low consumption of energy and cleaning media is also to be achieved.

The cleaning device for dispensing a gaseous medium, in particular compressed air, and/or a medium mixture that consists of the gaseous medium and a liquid medium, in particular water, preferably as a medium sequence, includes. The cleaning device mentioned at the outset has: a mixing element, preferably a venturi mixing element, having a first feed connection in a main medium feed line for feeding the gaseous medium for passage through the mixing element, a second feed connection in a medium feed branch line for feeding the liquid medium transversely to the passage into the mixing element, and a dispensing connection for dispensing the gaseous medium and/or the medium mixture, and a pressure chamber on the main medium feed line.

In this cleaning device, a switching valve is arranged in the main medium feed line, which is designed to prevent passage of the gaseous medium through the mixing element in a first switching state and to allow it in a second switching state, wherein the switching valve is arranged in the main medium feed line downstream of or at the pressure chamber, and the switching valve is formed as a 3/2-way valve or as a double check valve, and/or—in particular and optionally—a regulating device, namely a metering and/or control device, is arranged in the medium feed branch line, which is designed to regulate a feed of the liquid medium, in particular independently of the switching valve.

In the case where the cleaning device includes the switching valve and the regulating device, for a second switching state of the switching valve in the main medium feed line, in which passage of the gaseous medium through the mixing element is allowed: in a first state, the regulating device in the medium feed branch line prevents feeding of the liquid medium, wherein the gaseous medium is present at the dispensing connection in such a way that the latter can be supplied only with the gaseous medium, and in a second state, the regulating device in the medium feed branch line allows feeding of the liquid medium, and the gaseous medium is present at the dispensing connection and the liquid medium can be drawn in at the second feed connection in order to supply the dispensing connection with the medium mixture.

It is advantageous to keep the outlay in the cleaning of surfaces, in particular the outlay in terms of equipment and consumption of energy and cleaning media, as low as possible without, however, limiting the cleaning effect. This applies in particular to the cleaning of surfaces of a sensor or a sensor cover, for which a clean surface is a prerequisite for the proper and reliable functioning of the sensor.

It is advantageous for this purpose to design the switching valve in the main medium feed line downstream of or at the pressure chamber as a 3/2-way valve or as a double check valve. It is thereby possible to connect the pressure chamber on the main medium feed line to the mixing element in a particularly advantageous way, either for the passage of the gaseous medium through the mixing element or for preventing passage.

The switching valve can in each case have a medium source connection and a mixing element connection in the main medium feed line. The gaseous medium stored in the pressure chamber can thus be switched comparatively easily with comparatively advantageous formation of a pressure amplitude. In this way, cleaning of surfaces is possible in a particularly advantageous manner even with the gaseous medium alone. This advantage applies above all to a first variant, in which the switching valve is provided in the main medium feed line alone, i.e. in the form of a 3/2-way valve or double check valve, without the regulating device being present or being necessary in the medium feed branch line. In particular, an additional fluid pump for the liquid medium, in particular water, is advantageously rendered superfluous.

The switching valve in the form of a 3/2-way valve or double check valve is particularly advantageously also suitable in a function as a pressure chamber connecting valve. Moreover, the switching valve in the form of a double check valve can be switched comparatively quickly and simply. Furthermore, the switching valve in the form of a 3/2-way valve or double check valve can be used particularly advantageously as a pressure chamber connecting valve. The switching valve in the form of a 3/2-way valve can advantageously be used as a bridging valve, in particular having a bridging connection for bridging the mixing element, wherein the bridging connection is connected directly to the dispensing connection.

In addition, it has advantageously been recognized that an additional fluid pump for the liquid medium, in particular water, is rendered superfluous even in this case where a regulating device is provided. For a second switching state of the switching valve in the main medium feed line, in which passage of the gaseous medium through the mixing element is allowed, that: in a first state, the regulating device in the medium feed branch line prevents feeding of the liquid medium, wherein the gaseous medium is present at the dispensing connection in such a way that the latter can be supplied only with the gaseous medium, and in a second state, the regulating device in the medium feed branch line allows feeding of the liquid medium, wherein the gaseous medium is present at the dispensing connection and the liquid medium can be drawn in at the second feed connection in order to supply the dispensing connection with the medium mixture.

In this respect, in the second switching state of the valve, the gaseous medium flows through the mixing element, advantageously a venturi mixing element, and is advantageously present alone at the dispensing connection. Provision is therefore advantageously made for the mixing element to be a venturi mixing element; by means of a venturi nozzle, a vacuum in the mixing element can be used in a particularly efficient way for the purpose of sucking in the liquid medium, and—insofar as this is not the case—the pressure amplitude is advantageously supported.

As a result, a reduction in outlay in terms of equipment and a reduced consumption of energy and cleaning media, in particular of the liquid medium, are thus achieved in a particularly advantageous manner compared with the prior art. This is accompanied by a reduction in the susceptibility to faults of the cleaning device, leading to reduced maintenance intervals and consequently to increased availability of the cleaning device.

This advantage applies above all to a first variant, in which the switching valve is provided in the main medium feed line alone, i.e. in the form of a 3/2-way valve or double check valve, without the regulating device being present or being necessary in the medium feed branch line.

This advantage also applies to a second variant, in which the switching valve—i.e. in the form of a 3/2-way valve or double check valve—is provided in combination with a regulating device in the medium feed branch line, namely the regulating device in the medium feed branch line is designed as a metering and/or control device.

In each case, the flow through the mixing element—preferably in the mixing element using the venturi effect—produces a vacuum, and this vacuum can draw in the liquid medium at the second feed connection as required. The liquid medium is then mixed with the gaseous medium in the mixing element, in particular a venturi mixing element. Thus, a medium mixture is produced in the mixing element. The dispensing connection is consequently supplied with the medium mixture without an additional pump having to deliver the liquid medium to the venturi mixing element.

In addition, however, the regulating device in the medium feed branch line is designed to regulate a feed of the liquid medium, in particular independently of the switching valve; namely, the regulating device in the medium feed branch line is designed as a metering and/or control device. This enables the amount of liquid medium to be added to be metered and/or controlled. Thus, the metering and/or control device can be formed with particular advantage in the form of a 2/2-way valve or a combination of a restrictor and an intermediate reservoir.

The metering and control of the quantity of the liquid medium to be added independently of the switching valve can take place, in the case of a 2/2-way valve, by way of its actuation times. In the case of the combination of a restrictor and an intermediate reservoir, metering of the quantity of liquid medium to be added independently of the switching valve can be performed by means of the intermediate reservoir, and control can be performed by means of the optionally adjustable restrictor.

With the feature of a switching valve as a 3/2-way valve or as a double check valve in the main medium feed line and/or a regulating device, namely a metering and/or control device, in the medium feed branch line, the disclosure relates, in particular, to two variants, namely: in the first variant only to the feature of the switching valve as a 3/2-way valve or as a double check valve, in the second variant, to the feature of the switching valve as a 3/2-way valve or as a double check valve in combination with the regulating device, namely the metering and/or control device.

In this further development, in particular, the switching valve and the optional regulating device, that is to say only the abovementioned two variants: either only the switching valve or the switching valve in combination with the regulating device.

Nevertheless, the variant of only the regulating device without the switching valve is likewise possible.

A compressed-air system according to an aspect of the disclosure includes: at least one sensor of a sensor system, wherein the sensor, in particular a transparent cover of the sensor, has a surface.

Furthermore, the compressed-air system has at least one cleaning device as described above.

Here, a first medium source of the compressed-air system can be connected via the main medium feed line to the medium source connection of the switching valve, and a second medium source of the compressed-air system can be connected via the medium feed branch line to the medium source connection of the regulating device and/or to the second feed connection of the mixing element, and at least one spray nozzle can be connected via a spray nozzle feed line to the dispensing connection.

In the compressed-air system, the advantages resulting from the cleaning device are transferred to a compressed-air system. In particular, the lower outlay in terms of equipment as a result of the elimination of the fluid pump which is otherwise additionally required and the lower dependence on mechanically moving parts is advantageous for applications in vehicles and the like machines, in particular mobile machines. Moreover, when the compressed-air system is used in a vehicle, the lower consumption of energy and cleaning media has an advantageous effect since energy and cleaning media are only available to a limited extent in vehicles and comparable mobile systems. Reliable cleaning is also important in a vehicle since sensors to be cleaned often take on critical and safety-relevant tasks.

The advantages of the cleaning device are transferred to the cleaning method.

The control system advantageously has an open-loop and/or closed-loop control device, wherein the open-loop and/or closed-loop control device is designed to carry out the steps of the cleaning method. The advantages of the cleaning method and of the cleaning device are transferred to the control system.

According to an aspect, the present disclosure also presents a vehicle, in particular with a compressed-air system and with a control system, wherein a pneumatic system for supplying the first medium source with the gaseous medium is connected to the compressed-air system, and a window cleaning system for supplying the second medium source with the liquid medium is connected to the compressed-air system.

In the vehicle, the advantages of the compressed-air system and of the control system are advantageously transferred analogously. In the case of the vehicle, this results, in particular, in the advantage that additional fluid tanks for the compressed air and the water can be dispensed with. This advantageously reduces the outlay in terms of equipment and thus the susceptibility of the system to faults and consequently likewise the costs.

In a further development, the method advantageously has the following steps: activating the switching valve of the compressed-air system and passing compressed air out of either the first medium source or the pressure chamber to the cleaning device, operating the switching valve of the cleaning device in the first switching state, in which passage of the gaseous medium through the mixing element is prevented, and wherein, in a first state, the regulating device in the medium feed branch line prevents feeding of the liquid medium, supplying the dispensing connection with the gaseous medium and passing the gaseous medium from the dispensing connection to the at least one spray nozzle, supplying only the gaseous medium to the surface, in particular in a pulse-type manner.

In a further development, the method advantageously has the following steps: selectively switching the switching valve of the cleaning device to the second switching state, in particular between the first and the second switching state, in which passage of the gaseous medium through the mixing element is allowed, wherein, in a second state, the regulating device in the medium feed branch line allows feeding of the liquid medium, drawing in the liquid medium at the second feed connection of the cleaning device, preferably by the venturi principle, mixing the first and the second medium in the venturi mixing element to form a medium mixture, supplying the dispensing connection with the medium mixture and passing the medium mixture from the dispensing connection to the at least one spray nozzle, supplying the medium mixture to the surface, in particular in a pulse-type manner.

In particular, after the selective switching of the switching valve of the cleaning device to the first switching state, it is possible to envisage: activating the regulating device, wherein, in a first state, the regulating device in the medium feed branch line prevents feeding of the liquid medium and/or, in a second state, allows feeding of the liquid medium. The cleaning of a surface can preferably take place in a time-controlled manner, in particular alternately and/or intermittently.

Advantageously, the cleaning of a surface can take place in a time-controlled manner, in particular alternately and/or intermittently. In particular the cleaning device can be designed to dispense the gaseous medium, in particular compressed air, and the medium mixture in an alternating manner as a medium sequence. In concrete terms, this means that the surface to be cleaned can be supplied alternately, for example, with a sequence of gaseous medium, the medium mixture and, again, followed by the gaseous medium.

This sequence makes possible in an advantageous manner effective removal of dirt particles which may adhere to the surface. For example, a first application of compressed air could loosen existing dirt, a subsequent application of the medium mixture could soften the existing dirt and a final application, again of compressed air, could remove the dirt and dry the surface.

In addition, provision is advantageously made for the composition and succession of the medium sequence to be controllable in terms of time, in particular selectively and/or intermittently. This can be done specifically, in particular, by activating the switching valve and/or the regulating device. Depending on the degree of contamination, ambient conditions and operating parameters, optimum cleaning of the surface can advantageously be achieved by means of time-controlled application. Selective means, in particular, that only either the gaseous medium or the medium mixture is supplied to the surface at any one time. Defined pauses, in particular also within a medium sequence, can lie between the applications in order, for example, to soften dirt particles. Intermittent furthermore means, in particular, that the respective medium flows, in particular the flows of the gaseous medium and of the multiphase medium mixture, can in each case be triggered and interrupted. Alternatively, however, it is also possible to make the composition and succession of the medium sequence dependent on a detected degree of contamination of the surface to be cleaned.

In particular, the cleaning device can be designed to regulate the proportion of the liquid medium, in particular water, in the medium mixture. In concrete terms, this means that the proportion of the liquid medium in the medium mixture can be set via the vacuum generated in the venturi mixing element. Here, the vacuum achieved in the venturi mixing element can be set in a simple manner, e.g. via the configuration of the cross sections of the venturi mixing element, in particular the inlet cross section, the narrowest cross section and the outlet cross section, but also via the prevailing pressure difference between the mixing element inlet and outlet, that is to say via the speed of flow of the gaseous medium through the mixing element.

Advantageously, it is, in particular, conceivable that the proportion of the liquid medium, in particular water, in the medium mixture can be given as a percentage, for example by correlating the speed of flow of the gaseous medium with the liquid medium delivered and then scaling to a percentage scale. Thus, the proportion of the liquid medium in the medium mixture could be managed in a simple manner in terms of control technology.

Moreover, provision is advantageously made for the liquid medium, in particular water, to be deliverable from a medium source by the venturi principle. In concrete terms, this means that the liquid medium is delivered from a medium source into the venturi mixing chamber by means of the venturi effect. When a medium flows through the venturi mixing element, the dynamic pressure is maximum and the static pressure is minimum at the narrowest point of the mixing element. The speed of the flowing medium increases in proportion to the cross sections as it flows through the constricted part, since the same quantity of medium flows through everywhere because of the conservation of mass. At the same time, the pressure in the flowing medium falls. This gives rise to a differential pressure, which is then in turn used for drawing in the liquid medium. An additional pump for the liquid medium can thus advantageously be dispensed with, and the outlay in terms of equipment for the cleaning device is consequently reduced.

As a further development, the second switching state of the switching valve, only the gaseous medium, in particular compressed air, can be dispensed. In concrete terms, this means that the cleaning device first of all applies a compressed-air pulse to surfaces to be cleaned. This procedure is based on the fact that compressed air can be provided by a compressor or similar air compressor. The liquid medium is only available to a limited extent, particularly in mobile applications. For this reason, there is advantageously an initial attempt in a first step to loosen the dirt by means of a number of compressed-air pulses. The liquid medium is added optionally or only if necessary. This results in the advantage of particularly economical cleaning of the surface.

For this purpose, a second switching state of the switching valve in the main medium feed line, in which passage of the gaseous medium through the mixing element is allowed: in a first state, the regulating device in the medium feed branch line prevents feeding of the liquid medium, wherein the gaseous medium is present at the dispensing connection in such a way that the latter can be supplied only with the gaseous medium.

In this respect, the only additional provision is that in a second state, the regulating device in the medium feed branch line allows feeding of the liquid medium, wherein in the second switching state, the gaseous medium is present at the dispensing connection and the liquid medium can be drawn in at the second feed connection in order to supply the dispensing connection with the medium mixture.

In particular, the gaseous medium, in particular compressed air, and/or the medium mixture consisting of the gaseous medium and the liquid medium, in particular water, can be dispensed in a pulse-type manner; that is to say, in particular, in the manner of one or more pulses, that is to say in a pulse-type manner. This leads to a high cleaning effect.

The term "pulse-type" can furthermore refer to a sudden, jerky supply of a medium to a surface, the momentum of which medium is suitable, in particular, for mechanically detaching and removing particles, in particular dirt particles, located on the surface. In the case of a sudden, jerky supply of a medium to a surface, the momentum thereof is suitable, in particular, for mechanically detaching and removing particles, in particular dirt particles, located on the surface. In general, the cleaning effect of the pulse is advantageously increased here, inter alia, by a relatively high mass of the medium, a relatively high impact speed of the medium on the surface and relatively rapid triggering of the supply. Rapid triggering of the supply leads—especially in contrast to a slowly and continuously increasing flow of the medium—to impingement, in particular, of a limited air mass stored in a reservoir on the surface in a relatively short period of time. In this way, a high momentum is advantageously achieved.

In particular, the dispensing connection for dispensing the gaseous medium and/or the medium mixture can be the only dispensing connection. It is advantageous that a surface to be cleaned is supplied with a medium sequence, in particular a succession of at least selectively controlled gaseous medium or a medium mixture of a gaseous and a liquid medium, which is guided onto the surface in a jet. Here, the term "selectively controlled" means an alternating succession of supply with one or more compressed-air pulses, followed by selective supply with one or more pulses of a medium mixture of, for example, water and compressed air.

Provision is advantageously made for the switching valve to be arranged in the main medium feed line, between a first medium source and the first feed connection of the mixing element. In particular, provision is made for the switching valve to be arranged in the main medium feed line, downstream of a pressure limiting valve. A pressure venting valve, in particular in the form of a 3/2-way valve, is preferably arranged between the pressure limiting valve and the switching valve. As a result, depending on the design of a switching valve, medium sources for compressed air which are advantageous in different ways, in each case in relation to the application, can be formed with pressure limitation and optionally venting, in particular in the case of a switching valve or pressure chamber connecting valve in the form of a double check valve.

In the context of a particularly preferred development, the regulating device in the medium feed branch line is designed as a metering and control device which meters and controls the liquid medium. In particular, for this purpose that the metering and control device is designed as follows: having a control device, in particular in the form of an optionally adjustable restrictor, and a metering device, in particular in the form of an intermediate reservoir, and/or having a 2/2-way valve.

These developments of a metering and control device prove to be comparatively simple and advantageous for implementing metering and control of the liquid medium independently of the switching state of the switching valve.

In a first modified development, the pressure chamber is connected directly to a pressure chamber connection of the switching valve. For this purpose, the switching valve is designed, in particular, as a double check valve or a 3/2-way valve. Thus, in a particularly advantageous manner, the switching valve also assumes the function of a pressure chamber connecting valve.

In a second modified development, provision is advantageously made for the pressure chamber to be connected via a pressure chamber connecting valve to a medium source connection of the switching valve, in particular of the switching valve in the form of a 3/2-way valve.

This second modified development proves to be particularly advantageous in the case where the switching valve is formed as a bridging valve with a connection to a bypass line for bridging the mixing element. Alternatively or additionally, provision is thus advantageously made in the second modified refinement for the switching valve to be designed as a bridging valve, having a bridging connection for bridging the mixing element, wherein the bridging connection is connected directly to the dispensing connection.

Provision is advantageously made—especially in the case of the first or second modified development—for the first medium source to be connected via the main medium feed line to a medium source connection of the pressure chamber connecting valve or (that is to say and/or) to be connected to a medium source connection of the switching valve.

In particular, it has proven advantageous for the switching valve to be designed as a solenoid valve in the main medium feed line, namely as the 3/2-way valve or the double check valve, wherein the 3/2-way valve or the double check valve each have a medium source connection and a mixing element connection in the main medium feed line.

Provision is advantageously made for the cleaning device to have a heating device which is designed to heat, in particular preheat, the gaseous and/or liquid medium relative to an ambient temperature. Specifically, it is advantageous, particularly in cold seasons, to preheat the medium which is applied to the surface. The contamination to be removed during these seasons is, in particular, a snow or ice-dirt particle mixture, which is advantageously removed by the application of preheated media, in particular a preheated liquid medium. In mobile applications, it is advantageous to use the waste heat of an engine or similar internal combustion machine to preheat the medium, in particular liquid medium. Thus, as a result, the cleaning effect of the cleaning device is increased, particularly during cold seasons.

In particular, provision is furthermore made for the cleaning device to have an additional device, by means of which at least the second medium can be mixed with a cleaning agent, in particular a cleaning liquid. However, the substitutionary and/or supplemental addition of an antifreeze is also conceivable. The cleaning effect of the second medium, in particular water, is thereby increased in an advantageous manner. It is conceivable, for example, that contaminants containing oil may wet the surface to be treated. In this situation, water alone would have a significantly lower cleaning effect than a mixture of water and a cleaning agent, in particular a grease- and oil-dissolving cleaning agent. Moreover, adding an antifreeze to the liquid medium prevents the cleaning device from freezing at low temperatures. Thus, the cleaning device remains usable even in winter.

As a further development, provision is made for the switching valve to be arranged in the main medium feed line, between a first medium source and the first feed connection, and for the switching valve to have a first and a second switching state.

In the second switching state, the switching valve can be connected to the first feed connection via a mixing element connection, in particular a venturi mixing element connection.

Advantageously, in the first switching state, the switching valve can furthermore be connected via a bridging connection directly to the dispensing connection and via a medium source connection to the first medium source.

The first medium source can advantageously be connected to the bridging connection in the first switching state and to the first feed connection in the second switching state, the gaseous medium being present at the dispensing connection in the first switching state and the dispensing connection being able to be supplied only with the gaseous medium, and the liquid medium being able to be drawn in at the second feed connection in the second switching state in order to supply the dispensing connection with the medium mixture.

In particular, in the first switching state, the switching valve bridges the venturi mixing element and/or provides the first medium directly at the dispensing connection. In other words, unlike for a second switching state of the switching valve in the main medium feed line, in which passage of the gaseous medium through the mixing element is allowed, passage of the gaseous medium through the mixing element is not allowed for a first switching state of the switching valve in the main medium feed line.

In particular, this can mean that the switching valve is arranged between the first medium source and the first feed connection of the venturi mixing element. In the first switching state of the switching valve, the switching valve establishes a connection directly between the first medium source and the dispensing connection of the cleaning device, and the venturi mixing element is thus bridged in the process.

In the second switching state of the switching valve, the switching valve advantageously establishes a connection between the first medium source and the first feed connection of the venturi mixing element. In this case, the gaseous medium is passed through the venturi mixing element to the dispensing connection of the cleaning device. Owing to the venturi principle, the passage of the gaseous medium causes the liquid medium to be drawn in at the second feed connection of the venturi mixing element and thus leads to the generation of a medium mixture within the venturi mixing element.

The liquid medium is advantageously drawn in as required, that is to say in the case where cleaning of the surface by application of a number of compressed-air pulses has remained unsuccessful—in this case the switching valve switches to the second switching state. In a second state, the regulating device in the medium feed branch line advantageously allows feeding of the liquid medium, wherein the gaseous medium is present at the dispensing connection and the liquid medium can be drawn in at the second feed connection in order to supply the dispensing connection with the medium mixture.

This makes an additional fluid pump superfluous and thus results in the advantage of a reduced outlay in terms of equipment. In addition, supplying the medium mixture to the surface as required advantageously reduces the consumption of the liquid medium. This is advantageous particularly in the case of mobile applications since here the supply of liquid medium is generally very limited.

In addition, provision is advantageously made for the switching valve to be a 3/2-way valve. In concrete terms, this means that the switching valve is advantageously designed as a 3/2-way solenoid valve. The switching valve can thus be managed in a simple manner in terms of open-loop and closed-loop control. Consequently, the outlay in terms of open-loop and closed-loop control is advantageously reduced.

As a further development, provision is furthermore made for the regulating device to be arranged in the medium feed branch line between a second medium source and the second feed connection.

Advantageously, the regulating device can be connected via a venturi mixing element connection to the second feed connection and via a medium source connection to the second medium source, and the regulating device has a first and a second state, wherein the second medium source can be separated from the second feed connection in the first state and can be connected to the second feed connection in the second state. In particular, the cleaning device is designed to draw in the liquid medium at the second feed connection in the second state and to supply the dispensing connection with the medium mixture.

The regulating device is advantageously arranged between the second medium source and the second feed connection of the venturi mixing element. In the second switching state of the switching valve, the regulating device in the medium feed branch line establishes a connection between the second medium source and the second feed connection of the venturi mixing element in a second state. If the gaseous medium is passed through the venturi mixing element to the dispensing connection of the cleaning device, the venturi principle has the effect that the liquid medium is drawn in at the second feed connection of the venturi mixing element and thus leads to the generation of a medium mixture within the venturi mixing element.

This makes an additional fluid pump superfluous and thus results in the advantage of a reduced outlay in terms of equipment. In addition, supplying the medium mixture to the surface as required advantageously reduces the consumption of the liquid medium. This is advantageous particularly in the case of mobile applications, where the supply of liquid medium is limited. In the first state of the regulating device, the regulating device blocks the connection between the second medium source and the second feed connection. In this switching state, the cleaning device is designed to supply the surface exclusively with compressed air, in particular only with compressed-air pulses. This is particularly the case when the switching valve, which is arranged in the main medium feed line, prevents passage of the gaseous medium through the mixing element in a first switching state, and the gaseous medium is present or formed directly at the dispensing connection, and passage of the gaseous medium through the mixing element is allowed.

Provision is advantageously made for the regulating device to be, in particular, a 2/2-way valve. The regulating device is advantageously designed as a solenoid valve. Thus, the regulating device can be managed in a simple manner in terms of open-loop and closed-loop control. Consequently, the outlay in terms of open-loop and closed-loop control is advantageously reduced.

In a preferred development of the compressed-air system, provision is made for at least one spray nozzle to be designed with a common outlet opening for the first medium and the medium mixture.

In particular, the first medium source is designed as a compressed-air source, in particular a compressor, and the second medium source is designed as a fluid tank, in particular as a water tank. In this development, the compressed-air system can advantageously be integrated into a vehicle or similar mobile system since a vehicle generally already has a compressor and a water tank. Design changes to the vehicle or to a similar mobile system are thus reduced to a low level—a cleaning device can be retrofitted comparatively easily.

Provision is advantageously made for the second medium source, in particular the water tank, to be arranged spatially below the venturi mixing element. Thus, induction of the liquid medium only requires the force of gravity acting on the liquid medium to be overcome. Induction is advantageously accomplished by means of the venturi principle, thus eliminating the need for a further fluid pump, and the outlay in terms of equipment is thus advantageously reduced. Moreover, the water tank can thus be arranged at a more favorable point in terms of vehicle handling, that is to say as close as possible to the center of gravity of the vehicle.

As a further development, the first medium source can serve another primary purpose, in particular that of supplying an air spring system or similar pneumatic system. In this development, an already existing medium source, in particular a compressed-air source, can advantageously be used to supply the cleaning device. This is advantageous particularly in the case of use in a vehicle or similar mobile system since the number of components required is reduced and thus weight, costs and energy can be saved.

The second medium source can serve another primary purpose, in particular that of supplying a window cleaning system or similar cleaning system. In such a development, an already existing medium source, in particular a liquid and/or cleaning agent source, can advantageously be used to supply the cleaning device. This is advantageous particularly in the case of use in a vehicle or similar mobile system since the number of components required is reduced and thus weight, costs and energy can be saved.

In particular, provision is made for the switching valve of the compressed-air system to be designed, in particular, as a double check valve.

In a further development, provision is made for the switching valve and/or a pressure chamber connecting valve of the compressed-air system to be designed as a 3/2-way valve and/or double check valve; in particular, in combination with a quick-action vent valve or similar valve. This means that the switching valve and/or a pressure chamber connecting valve can be designed as a solenoid valve, this type of valve being easy to manage, particularly from the point of view of open-loop and/or closed-loop control. A double check valve or a quick-action vent valve proves to be mechanically robust and can be operated particularly advantageously without an external open-loop and/or closed-loop control signal; advantageously it can be easily adapted to the conditions of use.

In a preferred development of the compressed-air system, provision is made for the sensor to be an optical sensor, in particular an environment detection sensor, for example a LIDAR sensor, a radar sensor, a camera or similar sensor. In particular, the cleaning device improves the regular cleaning of the sensor surface and thus the functioning of the sensor, particularly since the optical properties of the sensor depend on the transparency and/or translucency of the sensor surface.

In a further development of the cleaning method, the cleaning of a surface takes place in a time-controlled manner, in particular alternately and/or intermittently. This results in the advantage that, in this case, a tailored sequence of compressed-air pulses and medium-mixture pulses, that is to say, for example, a sequence adapted to the degree of contamination of the surface, can be generated. Moreover, it is conceivable to adapt the time interval between the individual pulses in an advantageous manner. For example, a trial clean by means of a compressed-air pulse could first be attempted and, if this were inadequate, the contamination could then be partially dissolved by means of a medium-mixture pulse, this being followed by a sufficiently long time for the medium mixture to act on the contamination, with final removal of the contamination by means of a subsequent compressed-air pulse or sequence of compressed-air pulses.

Embodiments are now described below with reference to the drawing. These are not necessarily intended to represent the embodiments to scale; on the contrary, the drawing is executed in schematic and/or slightly distorted form, where useful for explanation. With regard to additions to the teachings directly recognizable from the drawing, attention is drawn to the relevant prior art. It should be borne in mind here that many modifications and changes relating to the form and detail of an embodiment can be made without departing from the general concept of the disclosure. The features which are disclosed in the description, in the drawing and in the claims may be provided both individually and in any desired combination. Moreover, all combinations of at least two of the features disclosed in the description, in the drawing and/or in the claims fall within the scope of the disclosure. Embodiments are not limited to the exact form or detail shown and described below, nor limited to subject matter which would be restricted in comparison with the subject matter claimed in the claims. In the case of specified dimensioning ranges, the intention is also to disclose values lying within the limits mentioned as limit values and to allow for them to be used and claimed in any way. For the sake of simplicity, the same reference signs are used below for identical or similar parts or parts with identical or similar functions.

FIG. 1 shows a first preferred embodiment of a cleaning device, wherein a switching valve 120 is arranged in the main medium feed line MZ1 and/or a regulating device 220 is arranged in the medium feed branch line MZ2, namely in general a metering and/or control device is arranged in the medium feed branch line MZ2. In this regard, FIG. 1 shows a schematic view of the first embodiment of the cleaning device 100 for dispensing a gaseous medium M1, in particular compressed air DL, and/or a medium mixture MG that consists of the gaseous medium M1 and a liquid medium M2, in particular water, preferably as a medium sequence MS, from a spray nozzle 230 on a spray nozzle feed line SZ. In the present case, a first medium source MQ1 connected to the main medium feed line MZ1 makes a pressure P available. In particular, the pressure P can be provided by means of a compressor K for the gaseous medium M1. In the present case, a pressure chamber 240 is connected to the main medium feed line MZ1 for this purpose.

Furthermore, FIG. 1 shows a mixing element 110, preferably, in particular, a venturi mixing element, having a first feed connection 111 in the main medium feed line MZ1 for feeding the gaseous medium M1 for passage through the mixing element 110, a second feed connection 112 in the medium feed branch line MZ2 for feeding the liquid medium M2 transversely to the passage into the mixing element 110, and a dispensing connection 113 for dispensing the gaseous medium M1 and/or medium mixture MG to the spray nozzle feed line SZ to the spray nozzle 230.

The switching valve 120, which is arranged in the main medium feed line MZ1 in the present case, is designed, in particular, for example as a solenoid valve MV, in particular as a 3/2-way valve. The switching valve 120 can also be designed as a double check valve. The switching valve 120, in particular the 3/2-way valve or the double check valve, has in each case a medium source connection MQA and a mixing element connection 121 in the main medium feed line MZ1.

A second medium source MQ2, in particular a water tank WT, connected to a medium feed branch line MZ2 can provide the liquid medium M2.

In the present case, in the first embodiment, in a first variant, in addition to the switching valve 120, a regulating device 220 is arranged in the; in this case, this is preferably designed as a metering and/or control device for regulating the feeding of the liquid medium M2, in particular independently of the switching valve 120.

In a first state, the regulating device 220 in the medium feed branch line MZ2 can prevent feeding of the liquid medium M2. Thus, the gaseous medium M1 flowing through the mixing element 110 is present at the dispensing connection 113 in such a way that the latter can be supplied only with the first gaseous medium M1. In a second state of the regulating device 220, the latter allows feeding of the liquid medium M2, in which case the gaseous medium M1 is thus present at the dispensing connection 113 and the liquid medium M2 is drawn in at the second feeding connection 112. As a result, a medium mixture MG of gaseous and liquid medium M1/M2 is supplied to the dispensing connection 113.

In this case, the liquid medium M2 is drawn in at the feed connection 112 by means of the venturi principle, that is to say the flow through the mixing element 110, which is preferably designed as a venturi mixing element, generates a vacuum in the latter, which in turn leads to the liquid medium M2 being drawn in automatically.

In this respect, in another, second variant, the regulating device 220 can also be dispensed with and only switching valve 120 may be provided in the main medium feed line MZ1, the liquid medium M2 nevertheless being drawn in at the feed connection 112 by means of the venturi principle, wherein feeding of the liquid medium M1 to the mixing element 110 should be allowed in a suitable manner.

In another, third variant, the switching valve 120 in the main medium feed line MZ1 can be dispensed with, and only the regulating device 220 may be provided in the medium feed branch line MZ2; in this respect, passage of the gaseous medium M1 through the mixing element 110 should be allowed in a suitable manner, and the liquid medium M2 is nevertheless drawn in at the feed connection 112 by means of the venturi principle, even without the switching valve 120.

In the general embodiment of FIG. 1, however, a switching valve 120 is in the present case arranged in the main medium feed line MZ1, which is designed to prevent passage of the gaseous medium M1 through the mixing element 110 in a first switching state S1 and to allow it in a second switching state S2. The two switching states S1/S2 are not explicitly shown in FIG. 1 and can therefore be implemented in any expedient manner; some preferred exemplary embodiments are explained with the figures below.

Figure 2A:
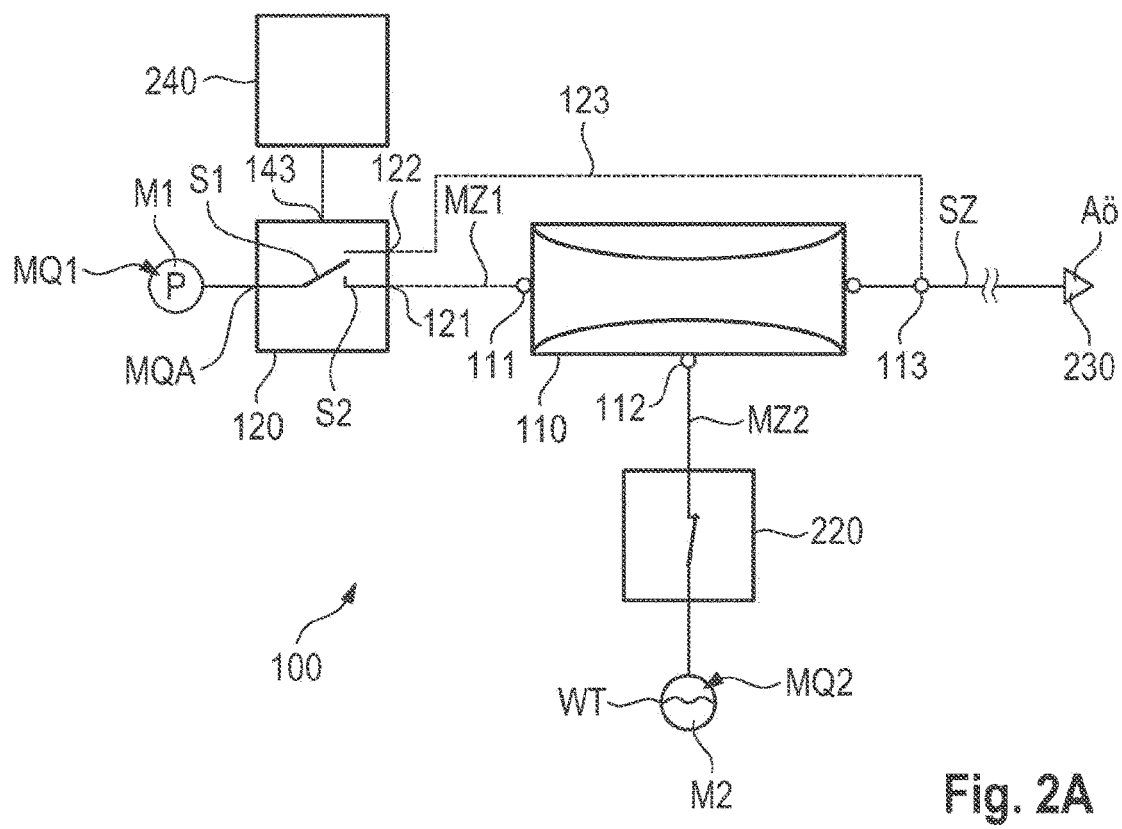
FIG. 2A shows a second preferred embodiment of the cleaning device, wherein a switching valve is arranged in the main medium feed line and is connected to a bypass line to the mixing element, and/or a regulating device is arranged in the medium feed branch line, namely a metering and/or control device is arranged in the medium feed branch line.

FIG. 2A shows a second preferred embodiment of the cleaning device, wherein a switching valve is arranged in the main medium feed line and is connected to a bypass line 123 with respect to the mixing element 110, and/or a regulating device 220 is arranged in the medium feed branch line MZ2, namely a metering and/or control device is arranged in the medium feed branch line MZ2. FIG. 2A shows the schematic view of a general embodiment of the cleaning device 100 for cleaning a surface O with preferably a medium sequence MS consisting of a gaseous medium M1 and, as required, a medium mixture MG consisting of the gaseous medium M1 and a liquid medium M2.

In particular here, a regulating device 220 depicted is not absolutely necessary; therefore, the other, second variant is to be preferred, according to which the regulating device 220 may also be dispensed with and only the switching valve 120 is provided in the main medium feed line MZ1. However, it may nevertheless be advantageous for the mixing chamber 110 to dry when the regulating device 220 is closed (i.e. without flow through, namely without water flowing through) so that there is no risk of icing up. This, in turn, tends to work in favor of the first variant since feeding of the liquid medium M2 can then be prevented by means of the regulating device 220 in a first state in the medium feed branch line MZ2.

In the present case, a first medium source MQ1, in particular a compressor K, which is connected to a first medium feed line MZ1, provides the gaseous medium M1, and a second medium source MQ2, in particular a water tank WT, which is connected to a second medium feed line MZ2, provides the liquid medium M2.

Furthermore, FIG. 2A also shows a (venturi) mixing element 110 having a first feed connection 111 for connecting the first medium source MQ1, a second feed connection 112 for connecting the second medium source MQ2, and a dispensing connection 113. Furthermore, the gaseous medium M1 or the medium mixture MG passes via the dispensing connection 113 to a spray nozzle for supplying a surface O.

In the preferred second embodiment, the switching valve 120 is located in the main medium feed line MZ1, and a regulating device 220 is located in the medium feed branch line MZ2. According to this, in principle, second embodiment, the switching valve 120 is designed as a bridging valve, namely having a bridging connection 122 for bridging the mixing element 110, wherein the bridging connection 122 is connected directly to the dispensing connection 113 of the mixing element 110. The switching valve 120 also has a mixing element connection 121 to the mixing element 110. In the second preferred embodiment, the switching valve 120 is arranged in the main medium feed line MZ1 between the first medium source MQ1 and the venturi mixing element 110. The switching valve 120 has a first switching state S1 and a second switching state S2.

In the first switching state S1, the switching valve 120 bridges the venturi mixing element 110 and supplies the dispensing connection 113 exclusively with the gaseous medium M1. In the second switching state S2, the switching valve 120 passes the gaseous medium M1 through the venturi mixing element 110. As a result, a vacuum is produced in the venturi mixing element 110 on the basis of the venturi principle, and the liquid medium M2 is thus drawn in from the second medium source MQ2 at the second feed connection 112 of the venturi mixing element 110. Thus, without an additional fluid pump, a two-phase medium mixture MG is produced within the venturi mixing element 110, which is then in turn supplied to the dispensing connection 113 of the cleaning device 100.

In the second preferred embodiment, the regulating device 220—which, as explained above, is optional—is arranged in the medium feed branch line MZ2 between the second medium source MQ2 and the venturi mixing element 110. In the present case, in the second embodiment, the regulating device 220 observably has an open state and a closed state.

In the first, open state, the regulating device 220 in this case blocks the connection between the second medium source MQ2 and the second feed connection 112 of the venturi mixing element 110. "Blocking" is meant in the sense that, although the gaseous medium M1 which is subsequently supplied to the dispensing connection 113 can flow through the venturi mixing element 110, induction of the liquid medium M2 is prevented or does not take place or can no longer take place during "blocking". In the closed state, the regulating device 220 opens the connection between the second medium source MQ2 and the second feed connection 112 for the liquid medium M2 to flow through. This takes place in accordance with requirements, namely in the present case selectively in a controlled manner, in order in this way to allow the liquid medium M2 to be drawn in at the second feed connection 112 on the basis of the venturi principle. Here, the liquid medium M2 is drawn in for as long as the gaseous medium M1 is flowing through the venturi mixing element 110 and the switching valve 120 is in the second switching state S2. As a result, a medium mixture MG is again supplied to the dispensing connection 113 of the cleaning device 100.

In general, the first and second embodiments are designed in such a way that, in their mode of operation for a first switching state S1 of the switching valve 120 in the main medium feed line MZ1, in which passage of the gaseous medium M1 through the mixing element 110 is prevented, the regulating device 220 in the medium feed branch line MZ2, in a first state, preferably also prevents feeding of the liquid medium M2 or is such that feeding of the liquid medium M2 does not take place.

In general, the regulating device 220 in the medium feed branch line MZ2 is designed as a metering and control device which regulates the liquid medium M2, in particular regulates it independently of the switching valve 120, i.e. meters and controls it. In one embodiment of FIG. 2D, the regulating device 220 in the medium feed branch line MZ2 has, for example, a control device 221—in particular in the form of an optionally adjustable restrictor—and a metering device 222—in particular in the form of an intermediate reservoir.

The regulating device 220 in the medium feed branch line MZ2 can additionally or alternatively have a 2/2-way valve 223, for example, for instance in one embodiment of FIG. 2B, FIG. 2D, FIG. 3A, FIG. 3C or FIG. 5.

Figure 2B:
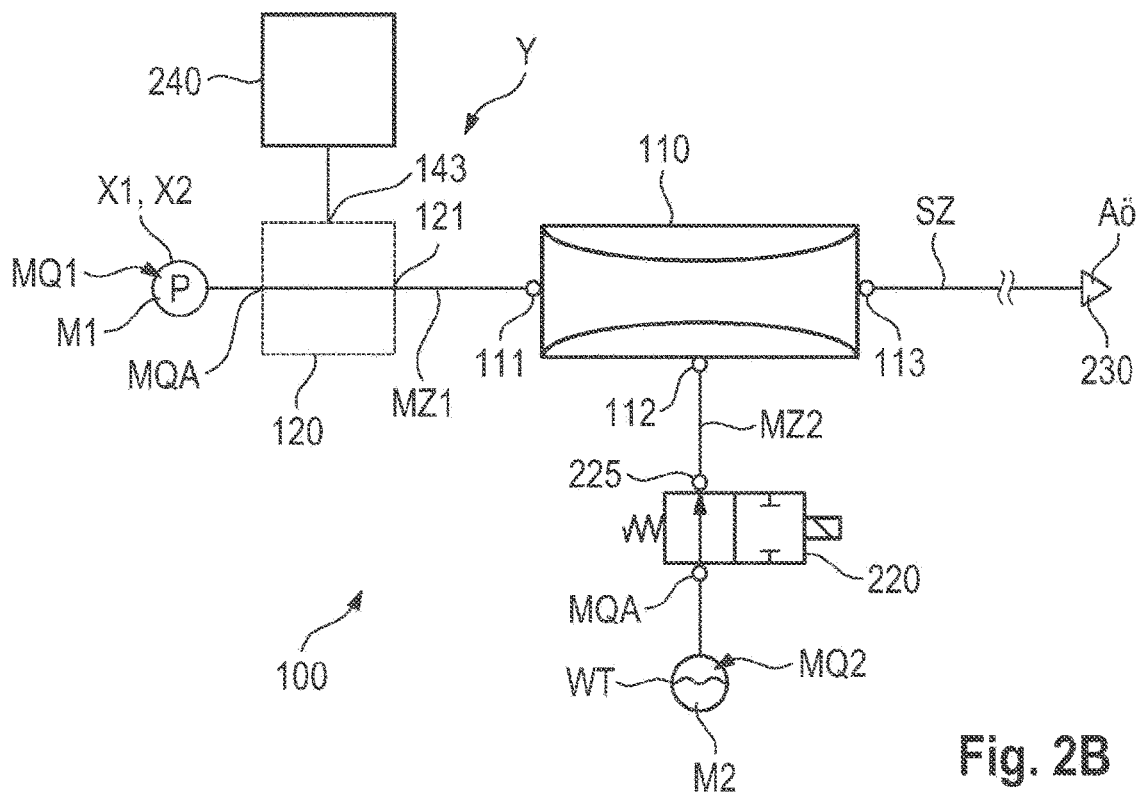
FIG. 2B shows a variant of the first preferred embodiment of the cleaning device as in FIG. 1, wherein the regulating device in the medium feed branch line is formed as a 2/2-way valve.
Figure 2C:
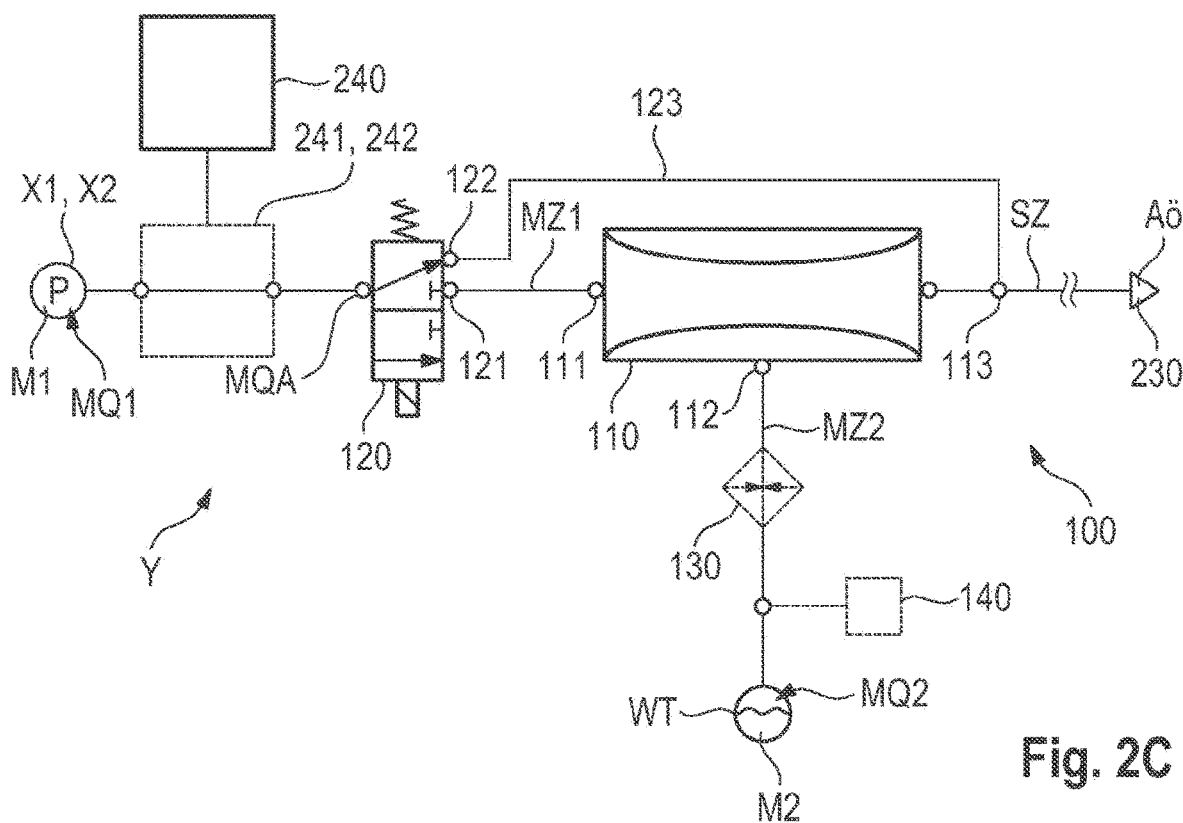
FIG. 2C shows a variant of the second preferred embodiment of the cleaning device as in FIG. 2, wherein the switching valve is arranged in the main medium feed line downstream of a pressure chamber connecting valve and wherein a heating and additional device is provided in the medium feed branch line and the regulating device is not provided in the medium feed branch line.

Additionally or alternatively, the regulating device 220 in the medium feed branch line MZ2 can be dispensed with, for example in one embodiment of FIG. 2C, but a heating and/or additional device 130, 140 can be provided for heating the liquid medium M2.

Figure 3A:
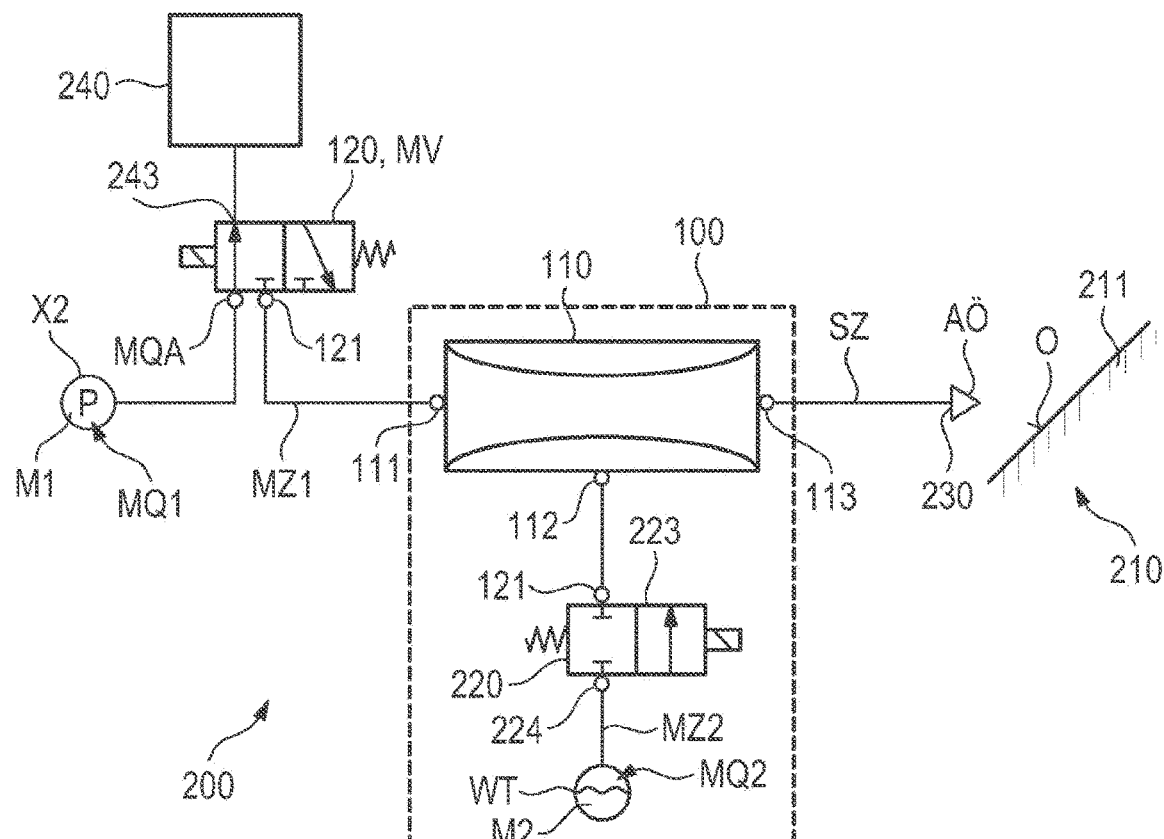
FIG. 3A shows a modification of the first preferred embodiment of the cleaning device of FIG. 1, wherein the switching valve is arranged in the main medium feed line and the regulating device, namely a metering and/or control device, is arranged in the medium feed branch line, wherein the switching valve is formed as a 3/2-way valve and the regulating device is formed as a 2/2-way valve.
Figure 3B:
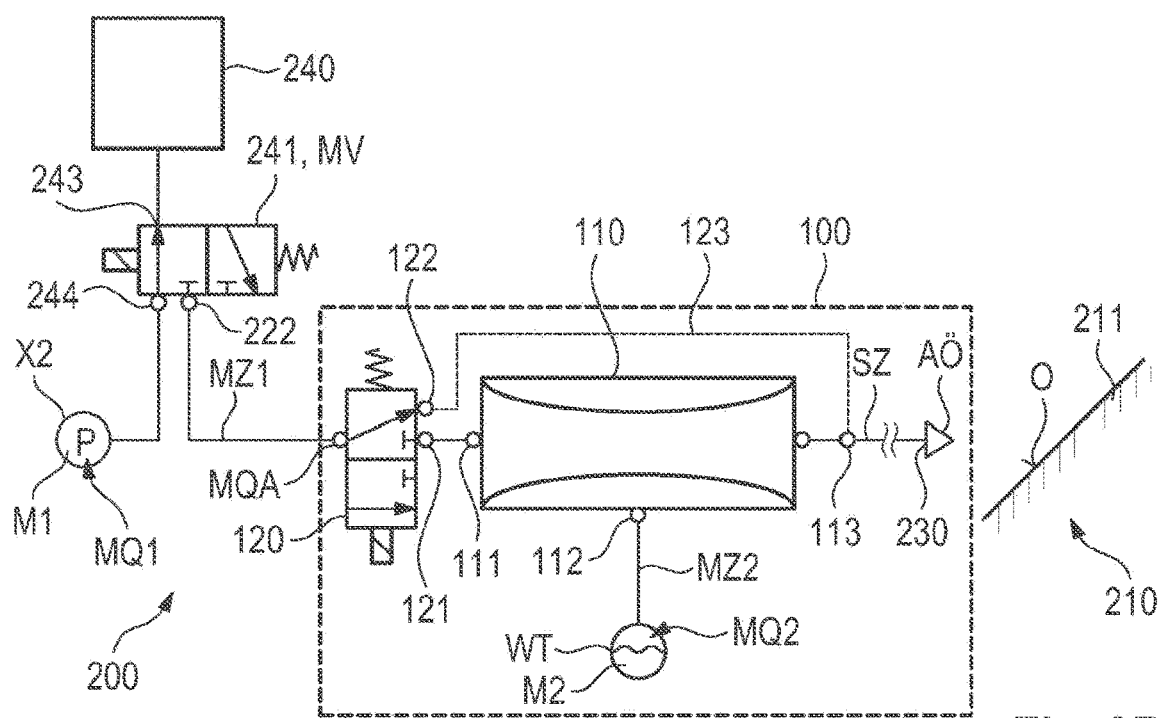
FIG. 3B shows a modification of the second embodiment of FIG. 2C with a pressure chamber connecting valve in version (I) of detail Y (in FIG. 2E) without a regulating device in the medium feed branch line.
Figure 3C:
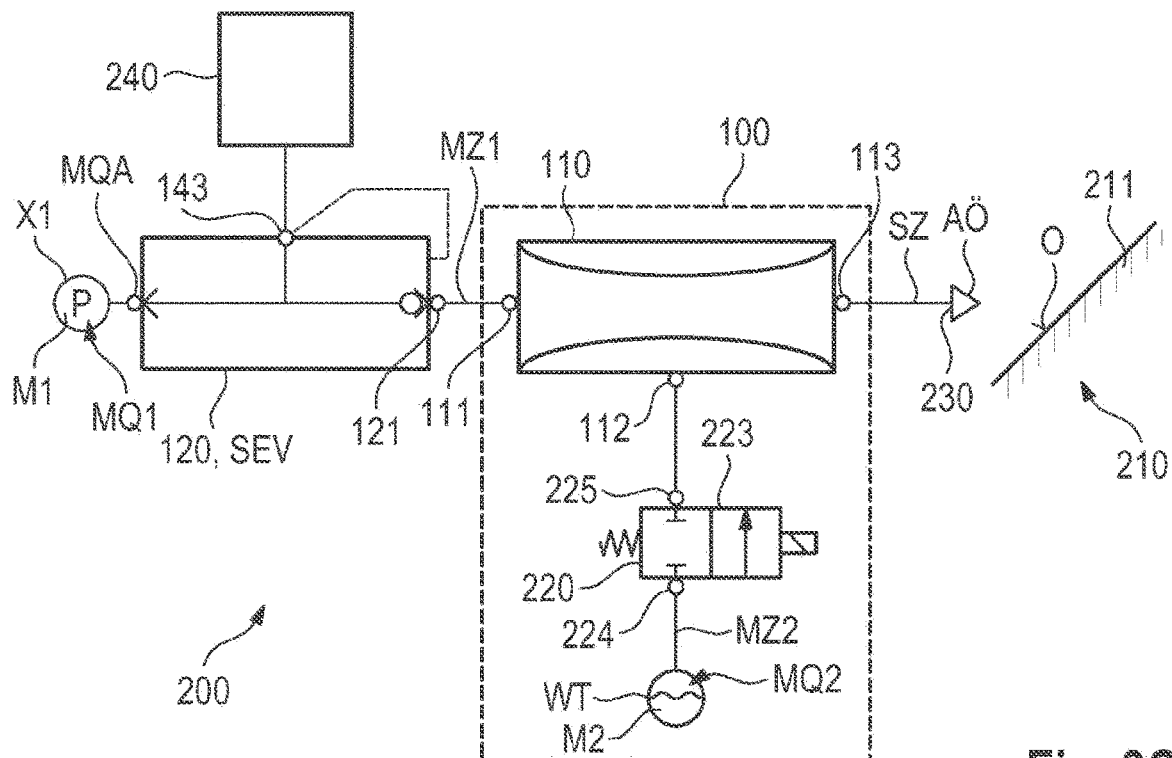
FIG. 3C shows a modification of the first embodiment of FIG. 2B, wherein, according to version (II) of detail Y (in FIG. 2E), the switching valve is formed as a double check valve.
Figure 3D:
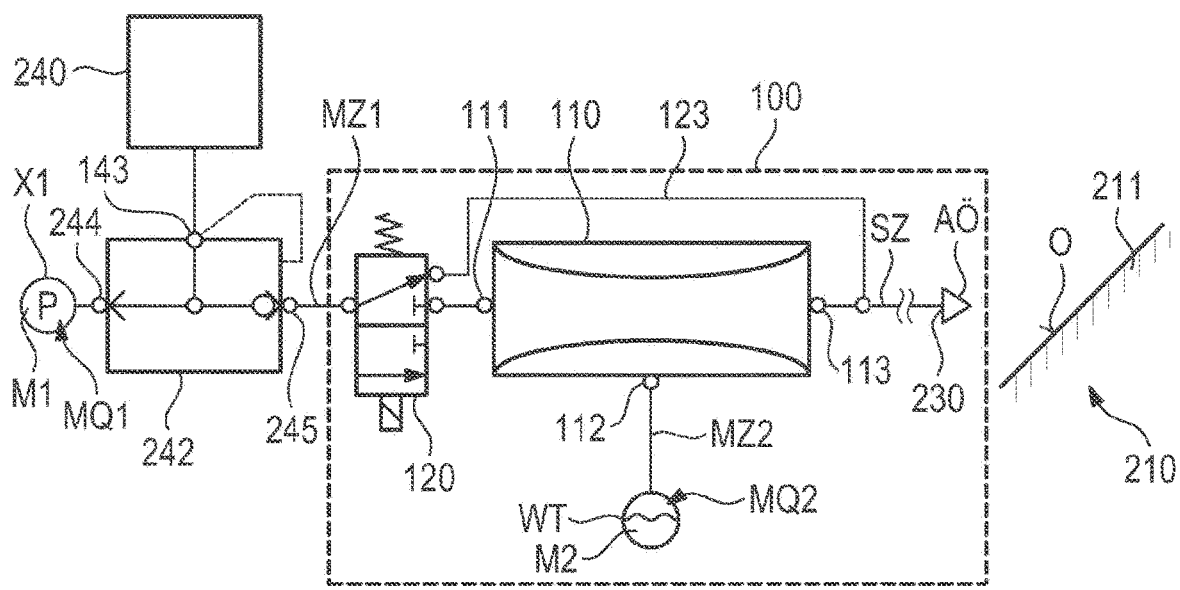
FIG. 3D shows a modification of the embodiment of FIG. 2C with a pressure chamber connecting valve in version (II) of detail Y (in FIG. 2E) without a regulating device in the medium feed branch line.

Additionally or alternatively, the regulating device 220 in the medium feed branch line MZ2 can also be dispensed with, and the medium feed branch line MZ2 can be free of fittings, for example, in the embodiment of FIG. 3B or FIG. 3D.

FIG. 2B shows a variant of the first preferred embodiment of the cleaning device as in FIG. 1, wherein the regulating device in the medium feed branch line is formed as a 2/2-way valve. In this regard, FIG. 2B shows the preferred embodiment of the cleaning device 100, wherein a first medium source MQ1 is connected via the main medium feed line MZ1 to the first feed connection 111 of the venturi mixing element 110. Furthermore, the venturi mixing element 110 has a dispensing connection 113. In the present case, the switching valve 120 can also be embodied as a 2/2-way solenoid valve MV.

The switching valve 120 and/or the regulating device 220 in the form of a solenoid valve MV has a medium source connection (MQA for the switching valve 120) for connecting the solenoid valve MV to the first or second medium source MQ1, MQ2.

The switching valve 120 has a venturi mixing element connection 121 for connecting the solenoid valve MV to the first feed connection 111 of the venturi mixing element 110, or the regulating device 220 has a cleaning device connection 225 to the second feed connection 112 of the venturi mixing element 110, in each case via the main medium feed or medium feed branch line MZ1, MZ2.

In principle, a solenoid valve MV has, in the case of the switching valve, a first switching state S1 and a second switching state S2, or, in the case of the regulating device 220, an open and closed state (not illustrated). In the open state of the regulating device 220, the connection between the second medium source MQ2 and the venturi mixing element 110 is blocked, and therefore the dispensing connection is supplied exclusively with the gaseous medium M1, that is to say in particular with compressed air DL. In the closed state of the regulating device 220, subject to the condition that gaseous medium M1 from the first medium source MQ1 continues to flow through the venturi mixing element 110 and is subsequently supplied to the dispensing connection 113, the liquid medium M2, that is to say in particular water, is drawn in at the second feed connection 112 of the venturi mixing element 110 on the basis of the venturi principle, and the dispensing connection 113 is thus supplied with a medium mixture MG.

FIG. 2C shows a variant of the second preferred embodiment of the cleaning device as in FIG. 2, wherein the switching valve is arranged in the main medium feed line downstream of a pressure chamber connecting valve and wherein a heating and additional device is provided in the medium feed branch line and the regulating device is not provided in the medium feed branch line. FIG. 2C furthermore shows the preferred embodiment of the cleaning device 100, wherein a second medium source MQ2 is connected via the medium feed branch line MZ2 to the second feed connection 112 of the venturi mixing element 110. Furthermore, the venturi mixing element 110 has a dispensing connection 113.

Moreover, in the present case, a heating device 130 and an additional device 140 are optionally arranged in the medium feed branch line MZ2. In this case, the heating device is provided in order, if required, to preheat the liquid medium M2 before the medium mixture MG is applied to the surface O. This results in more effective removal of ice or snow from the surface O to be cleaned, particularly during colder seasons. Here, the additional device 140 is furthermore provided in order, if necessary, to add a cleaning agent to the liquid medium M2 before the medium mixture MG is applied to the surface O. This results, in particular, in more effective removal of, for example, oil-containing adhesions or the like from the surface O to be cleaned.

In the present case, the switching valve 120 is embodied as a 3/2-way solenoid valve MV and is arranged in the main medium feed line MZ1. The solenoid valve MV of the switching valve 120 has a medium source connection MQA for connecting the solenoid valve MV to the first medium source MQ1, and furthermore has a venturi mixing element connection 121 for connecting the solenoid valve MV to the first feed connection 111 of the venturi mixing element 110 in a first switching state S1. The solenoid valve MV of the switching valve 120 has a bridging connection 122 for connecting the solenoid valve MV to the dispensing connection 113 of the venturi mixing element 110 in a second switching state S2. Thus, in the first switching state S1, the solenoid valve MV of the switching valve 120 enables the dispensing connection 113 to be supplied exclusively with the gaseous medium M1 via the bypass line 123. In the second switching state S2, the solenoid valve MV allows the gaseous medium M1 to flow through the venturi mixing element 110, and thus, on the basis of the venturi principle, allows the liquid medium M2 to be drawn in at the second feed connection 112 of the venturi mixing element 110, and consequently allows the dispensing connection 113 to be supplied with the medium mixture MG.

Figure 2D:
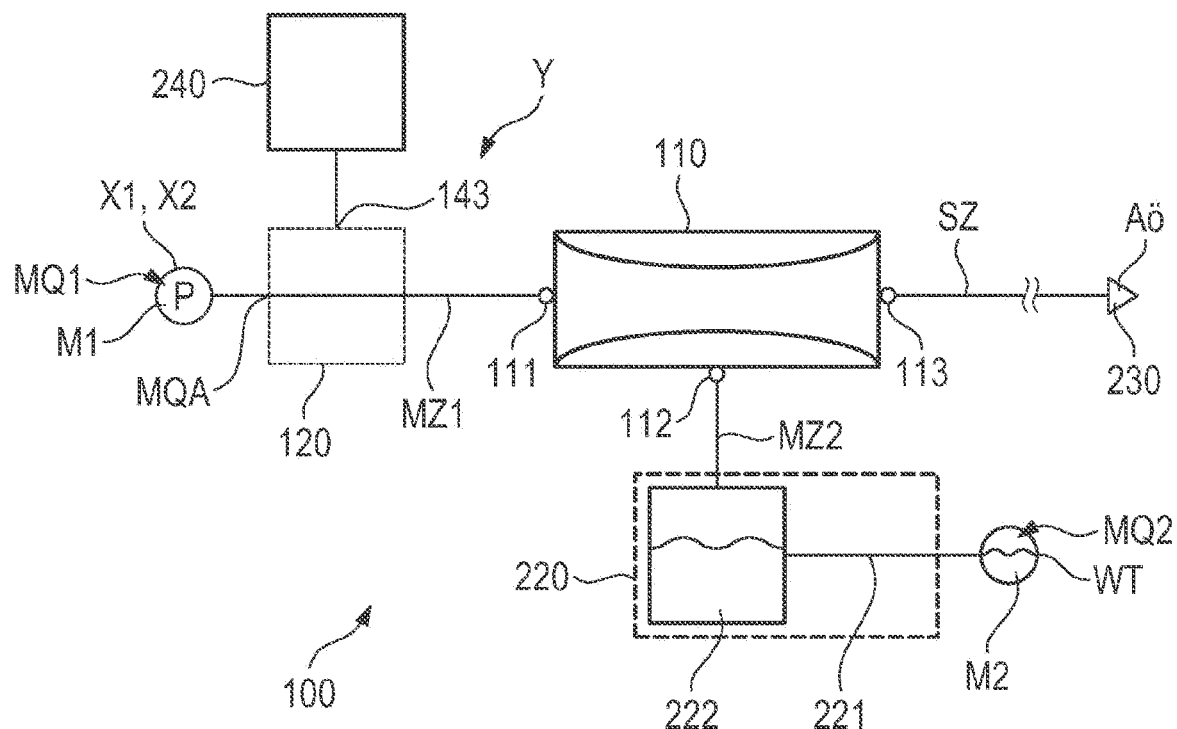
FIG. 2D shows a further variant of the first embodiment of the cleaning device as in FIG. 1, wherein the regulating device is formed in the medium feed branch line with an intermediate reservoir and a restrictor in the medium feed branch line.

FIG. 2D shows a further variant of the first embodiment of the cleaning device as in FIG. 1, wherein the regulating device 220 is formed in the medium feed branch line MZ2 with an intermediate reservoir 222 and a restrictor 221 in the medium feed branch line MZ2. In the present case, the first medium source MQ1 is again connected via the main medium feed line MZ1 to the first feed connection 111 of the venturi mixing element 110. Furthermore, the venturi mixing element 110 has a dispensing connection 113.

In the present case, the regulating device 220 is now shown as a combination of an intermediate medium reservoir 222 and a restrictor 221. Furthermore, the intermediate medium reservoir 222 and the restrictor 221 are located in the medium feed branch line MZ2, which connects the second medium source MQ2 to the second feed connection 112 of the venturi mixing element 110. Subject to the condition that gaseous medium M1 from the first medium source MQ1 flows via the main medium feed line MZ1 through the venturi mixing element 110 and is subsequently supplied to the dispensing connection 113, the liquid medium M2, that is to say in particular water, is drawn in from the intermediate medium reservoir 222 at the second feed connection 112 of the venturi mixing element 110 on the basis of the venturi principle, and, as a result, the dispensing connection 113 is thus supplied with a medium mixture MG. As soon as the supply of liquid medium M2 in the intermediate medium reservoir 222 has been used up, the restrictor 221 delays refilling of the intermediate medium reservoir 222 with liquid medium M2; once again, only the gaseous medium M1 is present at the dispensing connection 113 of the venturi mixing element 110. Suitable control of the flow through the venturi mixing element 110 with gaseous medium M1 thus allows the dispensing of a medium sequence consisting of the gaseous medium M1 and the medium mixture MG through the cleaning device 100.

Figure 2E:
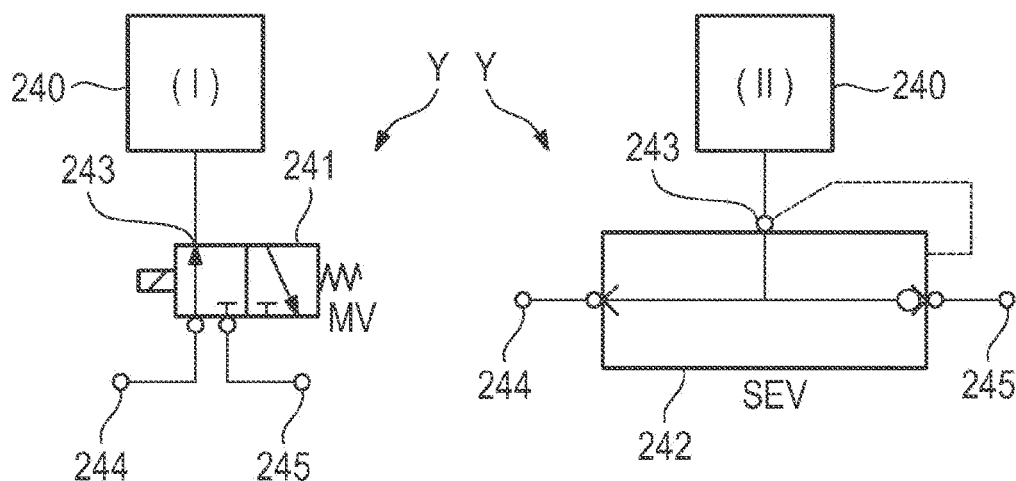
FIG. 2E shows a detail Y in a first version (I) and a second version (II) for the first preferred embodiment of a cleaning device, namely, in particular, for embodiments of FIG. 1, FIG. 2B, FIG. 2D and, in my opinion, also for a second embodiment of a cleaning device, namely, in particular, for embodiments of FIG. 2C.

FIG. 2E shows a detail Y of FIG. 1, FIG. 2B, and FIG. 2D in a first version (I) and a second version (II) for the first preferred embodiment of a cleaning device, namely, in particular, for variants of FIG. 1, FIG. 2B, FIG. 2D according to the first embodiment and, in my opinion, also for variants according to the second embodiment of a cleaning device, namely, in particular, for the embodiment of FIG. 2C.

In a preferred variant of embodiments of a cleaning device, namely, in particular, for variants of FIG. 1, FIG. 2A, FIG. 2B, FIG. 2D, FIG. 3A, FIG. 3C and FIG. 5, the pressure chamber 240 is connected directly to a pressure chamber connection 143 of the switching valve 120. For this purpose, the switching valve 120 can be designed, in particular, as a double check valve—as in, for example, FIG. 3C, FIG. 5—or a 3/2-way valve—as in, for example, FIG. 3A. In these cases—as indicated in FIG. 1, FIG. 2B and FIG. 2D—the switching valve can thus simultaneously fulfill the function of a pressure chamber connecting valve for the switching valve 120 between the medium source connection MQA and the venturi mixing element connection 121.

In another variant, the pressure chamber 240 can also be connected via an additional pressure chamber connecting valve 241, 242 to a medium source connection MQA of the switching valve 120, in particular of the switching valve 120 in the form of a 3/2-way valve. These variants can be seen, in particular, in the embodiments of FIG. 2C, FIG. 3B and FIG. 3D, in which the switching valve 120 is formed as a bridging valve for a mixing element 110, i.e. with a bridging connection 122 to a bypass line 123.

Such a pressure chamber connecting valve 241 is shown as a 3/2-way valve in a first version (I) of detail Y; and also in FIG. 3B. Such a pressure chamber connecting valve 242 is shown as a double check valve in a second version (II) of detail Y; and also in FIG. 3D.

In both versions I and II, such a pressure chamber connecting valve 241, 242 is in this respect arranged with medium source connection 244 and switching valve connection 245 in the main medium feed line downstream of the first medium source MQ1 and upstream in front of the switching valve 120 and has a pressure chamber connection 243. Thus, the first medium source MQ1 in both versions is connected via the main medium feed line MZ1 to the medium source connection 244 of the pressure chamber connecting valve 241, 242 and/or to a medium source connection MQA of the switching valve 120.

FIG. 3A shows one specific modification of the first preferred embodiment of the cleaning device of FIG. 1, wherein the switching valve 120 is arranged in the main medium feed line MZ1, and the regulating device 220, namely a metering and/or control device, is arranged in the medium feed branch line MZ2, wherein the switching valve 120 is formed as a 3/2-way valve and the regulating device 220 is formed as a 2/2-way valve. In this regard, FIG. 3A shows the preferred embodiment of the compressed-air system 200, wherein in the present case the cleaning device 100 is shown in the first preferred embodiment according to FIG. 1. The cleaning device 100 has a switching valve 120 in the main medium feed line MZ1 and the regulating device 220 in the medium feed branch line MZ2.

The use of the first, second or third variant, as explained in connection with FIG. 1, is possible in an analogous manner in the case of the cleaning device 100 of FIG. 3A.

Furthermore, in the present case, the dispensing connection 113 of the venturi mixing element 110 is connected via a spray nozzle feed line SZ to a spray nozzle 230, the spray nozzle 230 having an outlet opening AÖ. Via the spray nozzle 230, the surface O to be cleaned, which is, for example, a transparent cover 211 of a sensor 210, is selectively supplied with the gaseous medium M1 or with the medium mixture MG.

Moreover, the compressed-air system 200 has, in the main medium feed line MZ1, the switching valve 120 in a function as a pressure chamber connecting valve, which in the present case is designed as a 3/2-way solenoid valve MV. For this purpose, in a first switching state S1, the switching valve 120 connects a first medium source MQ1, in particular a compressed-air source, via a medium source connection MQA to a pressure chamber 240. In this case, this pressure chamber 240 serves as a compressed-air accumulator which, in contrast to, for example, a compressor K, can provide compressed air DL without delay as required.

Furthermore, in a second switching state S2, the switching valve 120, in a function as a pressure chamber connecting valve, connects the pressure chamber 240 via a mixing element connection 121 to the first feed connection 111 of the venturi mixing element 110 of the cleaning device 100. In the second switching state S2, the gaseous medium M1 thus flows through the venturi mixing element 110, and the surface O is consequently supplied with this via the spray nozzle 240.

Application of the medium mixture MG to the surface O in accordance with requirements is accomplished by means of suitable control of a regulating device 220 in the medium feed branch line MZ2 of the cleaning device 100. In the open state of this regulating device 220 (as shown in FIG. 3A), the second medium source MQ2 is shut off by the venturi mixing element 110, and thus only the gaseous medium M1, in particular compressed air DL, is applied.

In the other, closed state of the regulating device 220 in the medium feed branch line MZ2, on the other hand, the second medium source MQ2 is connected to the venturi mixing element 110. On the basis of the venturi principle, the liquid medium M2 is thus drawn in and the surface O is supplied with the medium mixture MG, provided that the second switching valve 220 is in the second switching state S2 and thus gaseous medium M1 flows from the pressure chamber through the venturi mixing element 110.

FIG. 3B shows one specific modification of the second embodiment of FIG. 2C with a pressure chamber connecting valve in version (I) of detail Y (in FIG. 2E) without a regulating device 220 in the medium feed branch line. In this regard, FIG. 3B shows a preferred embodiment of the compressed-air system 200, wherein in the present case the cleaning device 100 is shown in the third preferred embodiment, that is to say with an optional pressure chamber connecting valve 241 in the main medium feed line MZ1. In the present case, the switching valve 120 is embodied as a 3/2-way solenoid valve MV. Furthermore, in the present case, the dispensing connection 113 of the venturi mixing element 110 is connected via a spray nozzle feed line SZ to a spray nozzle 230, the spray nozzle 230 furthermore having an outlet opening AÖ. Via the spray nozzle 230, the surface O to be cleaned, which is, for example, a transparent cover 211 of a sensor 210, is selectively supplied with the gaseous medium M1 or with the medium mixture MG.

Analogously to the first preferred embodiment of the compressed-air system 200, shown in FIG. 3A, the main medium feed line MZ1 has a second 3/2-way solenoid valve MV as a pressure chamber connecting valve 241. The function of the pressure chamber connecting valve 241 and the switching valve 120 is as described above in FIG. 2E and the other figures.

FIG. 3C shows one specific modification of the first embodiment in FIG. 2B, wherein, according to version (II) of detail Y (in FIG. 2E), the switching valve is here formed as a double check valve, simultaneously functioning as a pressure chamber connecting valve. In this regard, FIG. 3C shows a preferred embodiment of the compressed-air system 200, wherein in the present case the cleaning device 100 is again shown in the first preferred embodiment, that is to say with the switching valve 120 in the main medium feed line MZ1 and the regulating device 220 in the medium feed branch line MZ2.

The use of the first, second or third variant, as explained in connection with FIG. 1, is possible in an analogous manner in the case of the cleaning device 100 of FIG. 3C. In the present case, the switching valve 120 is shown embodied as a double check valve or as a quick-action vent valve SEV. The double check valve has a medium source connection MQA for connecting a first medium source MQ1, and has a cleaning device connection 121 for connecting the quick-action vent valve SEV to the cleaning device 100.

The quick-action vent valve SEV of the switching valve 120 assumes the function of a previously shown 3/2-way solenoid valve MV as a pressure chamber connecting valve and switching valve. That is to say, in a first switching state S1 of the switching valve 120 in the form of the quick-action vent valve SEV, filling is in this case carried out directly via a pressure chamber connection 143 of the switching valve 120 by means of a first medium source MQ1, in particular a compressed-air source. In this case, this pressure chamber 240 serves as a compressed-air accumulator which, in contrast to, for example, a compressor K, can provide compressed air DL without delay as required.

In a second switching state S2 of the switching valve 120 as a quick-action vent valve SEV, the gaseous medium M1, in particular compressed air DL, then flows via the first feed connection 111 through the venturi mixing element 110.

Depending on the state of the regulating device 220, the second medium source MQ2 is either shut off from the venturi mixing element 110, and the switching valve 120 is in the first switching state S1, and therefore only the gaseous medium M1, in particular compressed air DL, is applied to the surface O.

In the closed state of the regulating device 220, in contrast, the second medium source MQ2 is connected to the venturi mixing element 110. On the basis of the venturi principle, the liquid medium M2 is thus drawn in and the surface O is therefore supplied with the medium mixture MG, provided that the quick-action vent valve SEV is in the second switching state S2 and thus gaseous medium M1 flows from the pressure chamber through the venturi mixing element 110.

FIG. 3D shows a modification of the embodiment of FIG. 2C with a pressure chamber connecting valve 241, 242 in version (II) of detail Y (in FIG. 2E) and without a regulating device 220 in the medium feed branch line MZ2. Here, the pressure chamber connecting valve 242 is in the form of a double check valve.

Figure 3E:
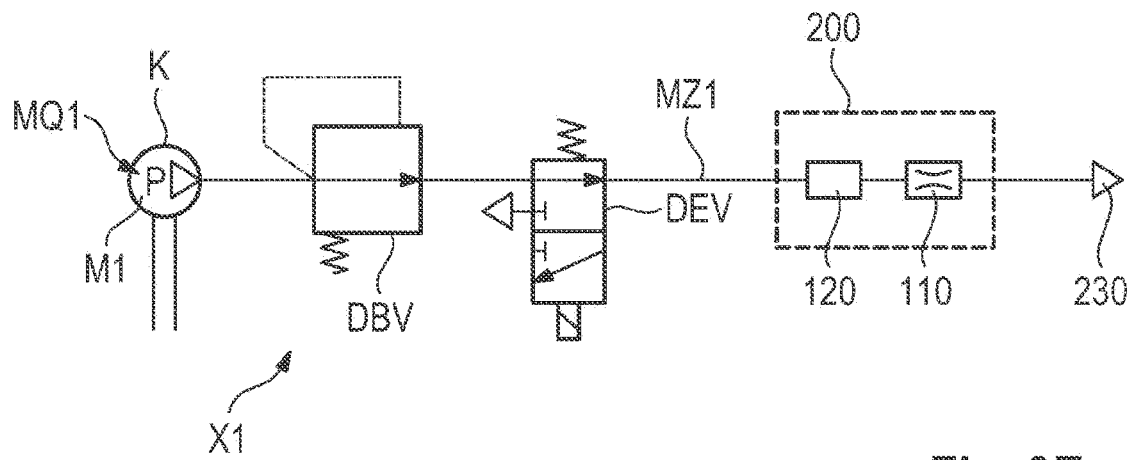
FIG. 3E shows a first version of a medium source according to a detail X1 with a compressor as the compressed-air source, a pressure limiting valve DBV and a 3/2-way solenoid valve as the pressure venting valve DEV.

FIG. 3E shows a first version of a first medium source MQ1 according to the detail X1 in the figures with a compressor K as the compressed-air source for a pressure P. In the main medium feed line MZ1 connected to the first medium source MQ1, a pressure limiting valve DBV and a 3/2-way solenoid valve as a pressure venting valve DEV in the main medium feed line MZ1 follow downstream for the gaseous medium M1 therein. The switching valve 120 in the compressed-air system 200 is arranged in the main medium feed line MZ1 downstream of the pressure limiting valve DBV. The pressure venting valve DEV, here in particular in the form of a 3/2-way valve, is arranged between the pressure limiting valve DBV and the switching valve 120. Thus, the switching valve 120 is also arranged downstream of the pressure venting valve DEV.

Figure 3F:
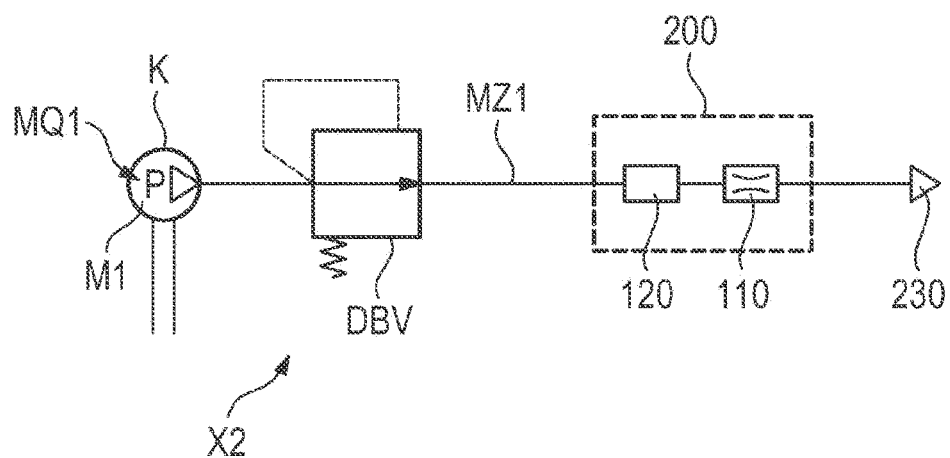
FIG. 3F shows a second version of a medium source according to a detail X2 with a compressor as the compressed-air source and a pressure limiting valve DBV, in particular only one pressure limiting valve DBV.

FIG. 3F shows a second version of a medium source MQ1 according to the detail X2 in the figures with a compressor K as the compressed-air source for a pressure P. In the main medium feed line MZ1 connected to the first medium source MQ1, a pressure limiting valve DBV, namely just a pressure limiting valve DBV in this embodiment, in contrast to that in FIG. 3E, follows downstream for the gaseous medium M1 therein. The switching valve 120 in the compressed-air system 200 is arranged in the main medium feed line MZ1 downstream of the pressure limiting valve DBV. That is to say that the pressure limiting valve DBV is in the present case arranged between the compressor K and the switching valve 120.

Figure 4:
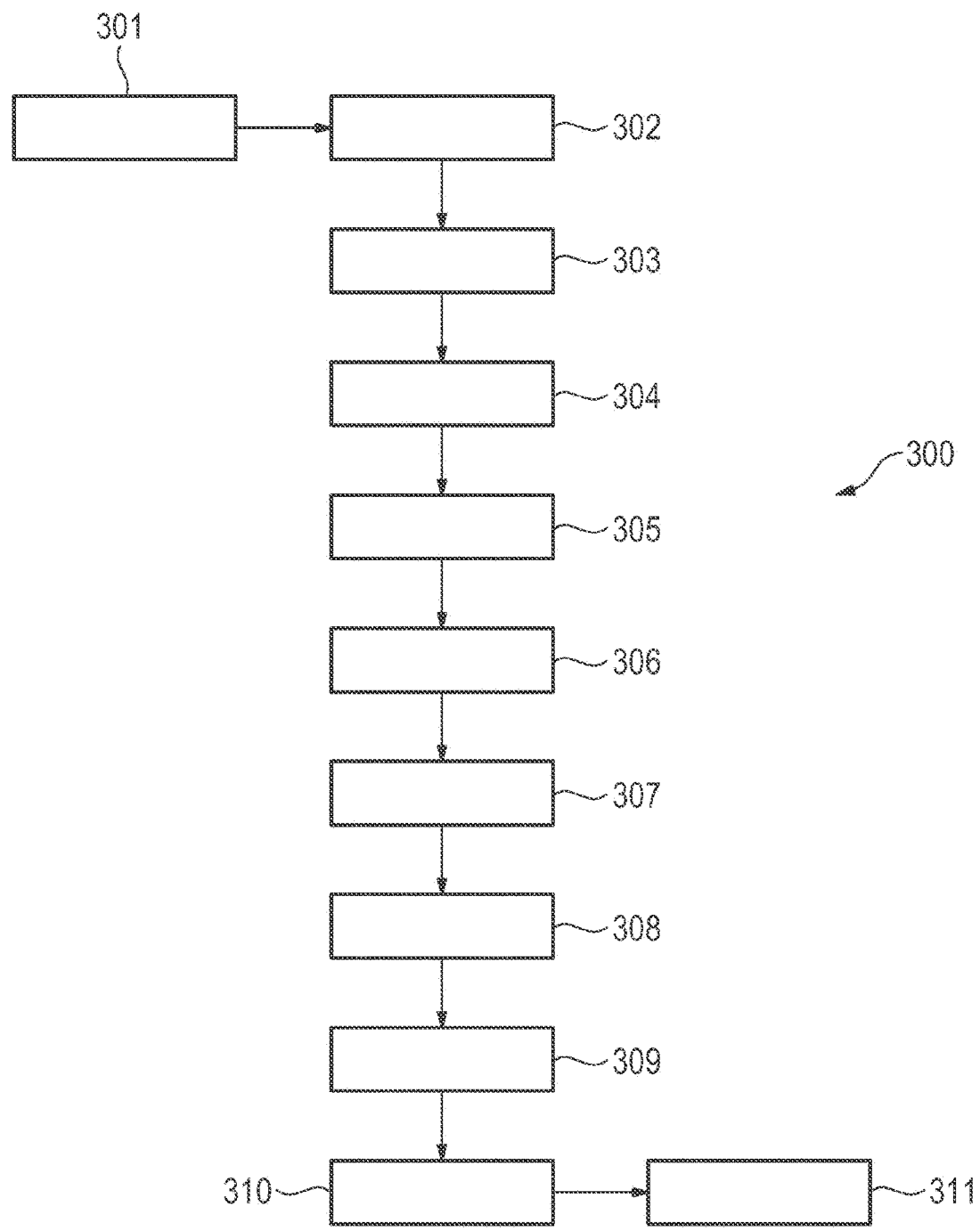
FIG. 4 shows a flow chart for a preferred embodiment of a cleaning method.

FIG. 4 shows a flow chart for a preferred embodiment of a cleaning method, namely a sequence of a preferred cleaning method 300.

Here, the cleaning method for cleaning a surface O, preferably with a medium sequence MS, passes through the following steps. In a first step, the switching valve 120 of the compressed-air system 200 is activated 301 in such a way that compressed air DL is passed out of either the first medium source MQ1 or the pressure chamber 240 to the cleaning device 100. In a next step, the first switching valve 120 of the cleaning device 100 is operated 302 in the first switching state S1. This then results in the dispensing connection 113 being supplied 303 with the gaseous medium M1 and furthermore to gaseous medium M1 being passed from the dispensing connection 113 to the at least one spray nozzle 230. As a result, the gaseous medium M1 is supplied 304 to the surface O, in particular in a pulse-type manner.

If required, the switching valve 120 of the cleaning device 100 is switched over 305 to the second switching state S2. This thus results in the liquid medium M2 being drawn in 306 at the second feed connection 112 of the cleaning device 100 by the venturi principle. As a result, mixing 307 of the gaseous and the liquid medium M1/M2 is brought about in the venturi mixing element 110 to form a medium mixture MG. The dispensing connection 113 is then in turn supplied 308 with the medium mixture MG, and thus the medium mixture MG is passed from the dispensing connection 113 to the at least one nozzle 230. In a further step, the medium mixture MG is applied 309 to the surface O, in particular in a pulse-type manner. The switching valve 120 of the cleaning device 100 is then selectively switched 310 back to the first switching state S1. Finally, the regulating device 220 of the compressed-air system 200 is activated 311 and the supply of compressed air DL to the cleaning device 100 is blocked.

Figure 5:
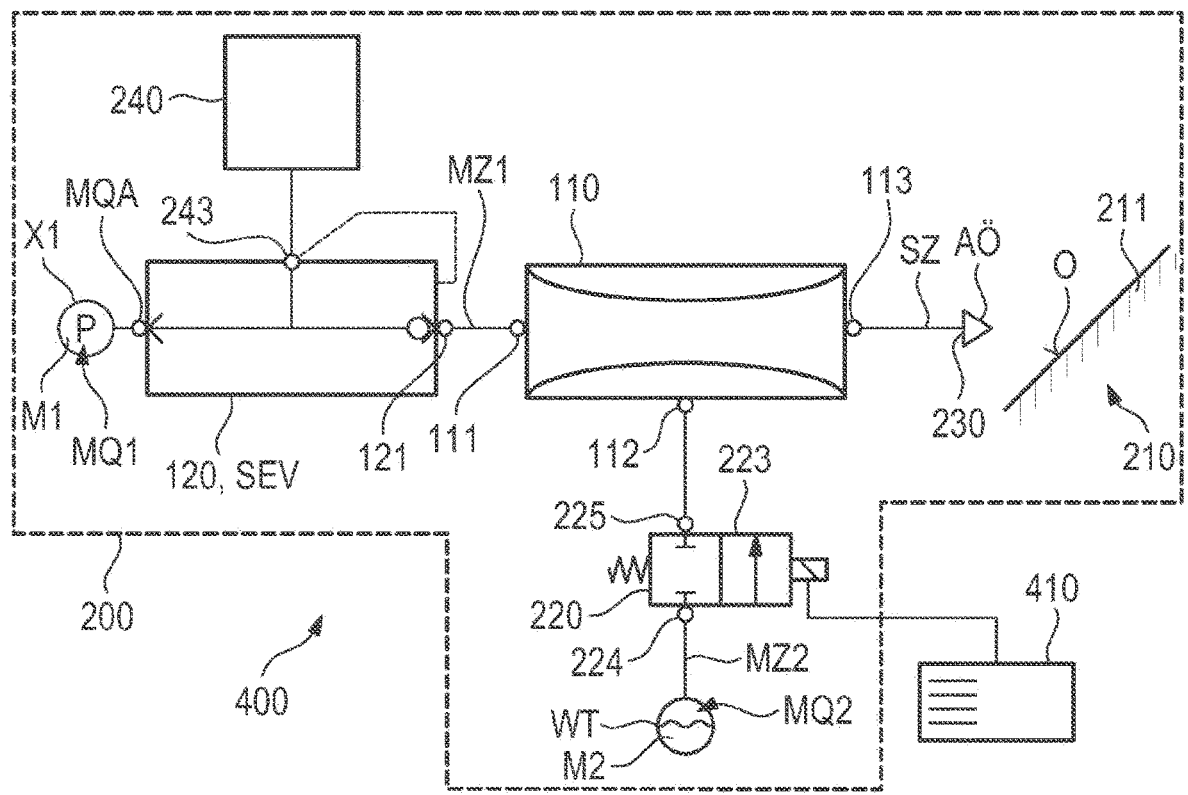
FIG. 5 shows a cleaning device in the embodiment of FIG. 3C, with a schematic illustration of a control system for an illustrative compressed-air system.

FIG. 5 shows a cleaning device in the embodiment of FIG. 3C, with a schematic illustration of a control system for an illustrative compressed-air system. The control system 400 for a compressed-air system 200 is designed by means of the open-loop and/or closed-loop control device 410 to carry out the steps of the cleaning method 300 for cleaning a surface O, preferably with a medium sequence MS, consisting of a gaseous medium M1 and/or a medium mixture MG.

Figure 6:
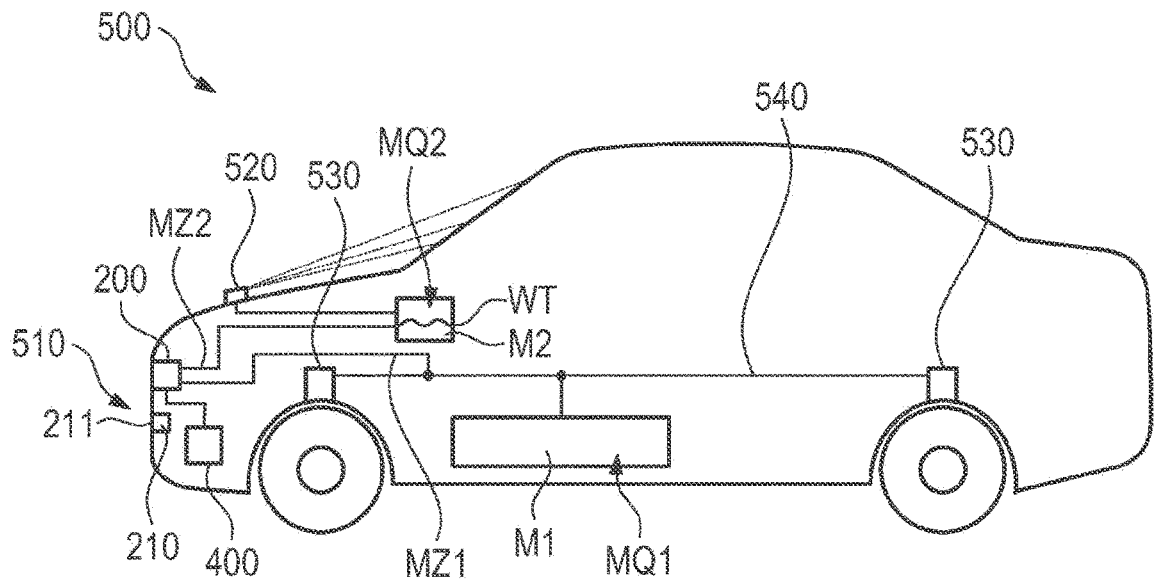
FIG. 6 shows a schematic illustration of a vehicle with a compressed-air system and a control system and a cleaning device.

FIG. 6 shows a schematic illustration of a vehicle with a compressed-air system and a control system and a cleaning device. In this regard, FIG. 6 shows a schematic illustration of a vehicle 500—in the present case in the form of a passenger car—having a compressed-air system 200 with a sensor 210 of a sensor system 510, wherein the sensor 210 has a transparent cover 211, and further having a control system 400.

In the present case, the first medium source MQ1 is formed by a compressed-air supply system 540, which is furthermore provided for supplying a pneumatic system 530 in the form of an air spring system.

It is also possible for the first medium source MQ1 to be formed by a separate compressor or similar compressed-air source. For the purpose of feeding the gaseous medium M1, the first medium source MQ1 is connected to the compressed-air system 200 via a first medium feed line MZ1.

In the present case, the second medium source MQ2 has a water tank WT, which is likewise used to supply a cleaning system in the form of a window cleaning system 520 with cleaning liquid, in particular water. This tank is connected via a second medium feed line MZ2 to the compressed-air system 200.

In this way, the liquid medium M2 can be supplied to the compressed-air system 200 via a pump (not shown here for reasons of clarity). Of course, it is also possible in the case of the second medium source MQ2 for this to be formed by a separate medium source of its own, which is, in particular, independent of other systems.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS 100 cleaning device
110 mixing element 111 first feed connection
112 second feed connection
113 dispensing connection
120 switching valve
121 mixing element connection of the switching valve
122 bridging connection of the switching valve
123 bypass line
130 heating device
140 additional device
143 pressure chamber connection of the switching valve 120
200 compressed-air system
210 sensor
211 transparent cover
220 regulating device
221 control device of the regulating device
222 metering device of the regulating device
23 2/2-way valve of the regulating device
224 medium source connection of the regulating device
225 cleaning device connection of the regulating device
230 spray nozzle
240 pressure chamber
241 pressure chamber connecting valve in the form of a 3/2-way valve
242 pressure chamber connecting valve in the form of a double check valve
243 pressure chamber connection of the pressure chamber connecting valve 241, 242
244 medium source connection of the pressure chamber connecting valve 241, 242
245 switching valve connection of the pressure chamber connecting valve 241, 242
300 method
301, 302, 303, method steps
304, 305, 306,
307, 308, 309,
310, 311
400 control system
410 open-loop and/or closed-loop control device
500 vehicle
510 sensor system
520 window cleaning system
530 pneumatic system
540 compressed-air supply system
AÖ outlet opening
$D_\alpha$ angle
DL compressed air
DRV double check valve
DBV pressure limiting valve
DEV pressure venting valve
K compressor
LFA air spring system
M1 gaseous medium
M2 liquid medium
MG medium mixture
MS medium sequence
MQ1 first medium source
MQ2 second medium source
MQA medium source connection of the switching valve 120
MV solenoid valve
MZ1 main medium feed line
MZ2 medium feed branch line
O surface
OS optical sensor
P pressure of the compressed air DL in the compressed air source of the first medium source MQ1
RA cleaning system
RF cleaning fluid
RM cleaning agent
S1 first switching state
S2 second switching state
SEV quick-action vent valve
SZ spray nozzle feed line
TUG ambient temperature
UES environment detection sensor
VQ valve cross section
WT water tank
X1, X2, Y detail

The invention claimed is:

1. A cleaning device for dispensing a gaseous medium and/or a medium mixture that consists of the gaseous medium and a liquid medium, the cleaning device comprising:
a mixing element having:
a first feed connection, in a main medium feed line, configured to feed the gaseous medium for passage through the mixing element,
a second feed connection, in a medium feed branch line, configured to feed the liquid medium transversely to the passage into the mixing element, and
a dispensing connection configured to dispense the gaseous medium and/or the medium mixture;
a pressure chamber on the main medium feed line;
a switching valve arranged in the main medium feed line, downstream of or at the pressure chamber, and configured to prevent passage of the gaseous medium through the mixing element in a first switching state and to allow passage of the gaseous medium in a second switching state, the switching valve being formed as a 3/2-way valve or as a double check valve; and
wherein the switching valve is configured as a bridging valve, the bridging valve having a bridging connection for bypassing the mixing element, wherein the bridging connection is connected directly to the dispensing connection.

2. The cleaning device as claimed in claim 1, wherein the mixing element is a venturi mixing element.

3. The cleaning device as claimed in claim 1, wherein the dispensing connection is the only dispensing connection.

4. The cleaning device as claimed in claim 1, wherein the switching valve is arranged in the main medium feed line between a first medium source and the first feed connection of the mixing element.

5. The cleaning device as claimed in claim 1, wherein the switching valve is arranged in the main medium feed line downstream of a pressure limiting valve.

6. The cleaning device as claimed in claim 5, wherein a pressure venting valve is arranged between the pressure limiting valve and the switching valve.

7. The cleaning device as claimed in claim 1, further comprising a regulating device arranged in the medium feed branch line and configured to regulate a feed of the liquid medium,
wherein in the second switching state of the switching valve in the main medium feed line, in which passage of the gaseous medium through the mixing element is allowed:
the regulating device in the medium feed branch line prevents, in a first state, feeding of the liquid medium, wherein the gaseous medium is present at the dispensing connection in such a way that the dispensing connection can be supplied only with the gaseous medium, and the regulating device in the medium feed branch line allows, in a second state, feeding of the liquid medium, wherein the gaseous medium is present at the dispensing connection and the liquid medium can be drawn in at the second feed connection in order to supply the dispensing connection with the medium mixture, and wherein the regulating device is designed as a metering and control device configured to meter and control the liquid medium, the metering and control device having:

an optionally adjustable restrictor that functions as a control device and an intermediate reservoir that functions as a metering device, and/or a 2/2-way valve.

8. The cleaning device as claimed in claim 1, wherein the pressure chamber is connected directly to a pressure chamber connection of the switching valve.

9. The cleaning device as claimed in claim 1, wherein the pressure chamber is connected via a pressure chamber connecting valve to a medium source connection of the switching valve.

10. The cleaning device as claimed in claim 1, wherein a first medium source is connected via the main medium feed line to a medium source connection of a pressure chamber connecting valve and/or to a medium source connection of the switching valve.

11. The cleaning device as claimed in claim 1, wherein the switching valve is designed as a solenoid valve in the main medium feed line, wherein the 3/2-way valve or the double check valve each have a medium source connection and a mixing element connection in the main medium feed line.

12. The cleaning device as claimed in claim 1, wherein a composition and spraying of a medium sequence can be controlled in terms of time.

13. The cleaning device as claimed in claim 1, wherein the gaseous medium and/or the medium mixture of the gaseous medium and the liquid medium can be dispensed in a pulse-type manner.

14. The cleaning device as claimed in claim 1, wherein a heating device is formed in the medium feed branch line, the heating device being configured to heat the liquid medium relative to an ambient temperature.

15. The cleaning device as claimed in claim 1, further comprising a cleaning agent source configured to provide a cleaning agent into the liquid medium.

16. The cleaning device as claimed in claim 1, further comprising a regulating device arranged in the medium feed branch line and configured to regulate a feed of the liquid medium, wherein in the second switching state of the switching valve in the main medium feed line, in which passage of the gaseous medium through the mixing element is allowed:

the regulating device in the medium feed branch line prevents, in a first state, feeding of the liquid medium, wherein the gaseous medium is present at the dispensing connection in such a way that the dispensing connection can be supplied only with the gaseous medium, and the regulating device in the medium feed branch line allows, in a second state, feeding of the liquid medium, wherein the gaseous medium is present at the dispensing connection and the liquid medium can be drawn in at the second feed connection in order to supply the dispensing connection with the medium mixture, and wherein for the first switching state of the switching valve, the regulating device in the medium feed branch line prevents feeding of the liquid medium.

17. A compressed-air system for cleaning a surface, the compressed-air system comprising:

at least one sensor of a sensor system, the at least one sensor having a sensor surface;

at least one cleaning device as claimed in claim 1;

a first medium source configured to be connected via the main medium feed line to a medium source connection of the switching valve;

a second medium source configured to be connected via the medium feed branch line to the second feed connection of the mixing element; and at least one spray nozzle configured to be connected via a spray nozzle feed line to the dispensing connection.

18. The compressed-air system as claimed in claim 17, wherein the at least one spray nozzle is designed with a common outlet opening for the gaseous medium and the medium mixture.

19. The compressed-air system as claimed in claim 17, wherein the first medium source is a compressed-air source and the second medium source is a fluid tank, and/or the second medium source is arranged below the mixing element.

20. The compressed-air system as claimed in claim 17, wherein the first medium source is configured to supply an air spring system or a similar pneumatic system, and/or the second medium source is configured to supply a window cleaning system.

21. The compressed-air system as claimed in claim 17, wherein the sensor is an optical sensor.

22. A cleaning method for cleaning a surface, comprising: providing the cleaning device as claimed in claim 1; and cleaning the surface with the cleaning device.

23. A vehicle having a compressed-air system as claimed in claim 17, wherein a pneumatic system configured to supply the first medium source with the gaseous medium is connected to the compressed-air system, and a window cleaning system configured to supply the second medium source with the liquid medium is connected to the compressed-air system.

* * * * *